US011958194B2

(12) United States Patent
Ludhiyani et al.

(10) Patent No.: US 11,958,194 B2
(45) Date of Patent: Apr. 16, 2024

(54) CONTROL COMMAND BASED ADAPTIVE SYSTEM AND METHOD FOR ESTIMATING MOTION PARAMETERS OF DIFFERENTIAL DRIVE VEHICLES

(71) Applicant: Tata Consultancy Services Limited, Mumbai (IN)

(72) Inventors: Mohit Ludhiyani, Kolkata (IN); Arup Kumar Sadhu, Kolkata (IN); Titas Bera, Kolkata (IN); Ranjan Dasgupta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 876 days.

(21) Appl. No.: 17/000,908

(22) Filed: Aug. 24, 2020

(65) Prior Publication Data

US 2021/0097437 A1 Apr. 1, 2021

(30) Foreign Application Priority Data

Sep. 27, 2019 (IN) .............................. 201921039285

(51) Int. Cl.
*G06N 3/04* (2023.01)
*B25J 9/16* (2006.01)
(Continued)

(52) U.S. Cl.
CPC .............. *B25J 9/163* (2013.01); *G01D 21/02* (2013.01); *G06F 18/214* (2023.01);
(Continued)

(58) Field of Classification Search
CPC ......... H04L 45/50; H04L 12/18; H04L 45/52; H04L 45/748; H04L 45/04; H04L 45/74; H04L 45/16
See application file for complete search history.

(56) References Cited

U.S. PATENT DOCUMENTS 5,416,712 A 5/1995 Geier et al.
8,374,785 B2 2/2013 McBurney et al.
(Continued)

FOREIGN PATENT DOCUMENTS

CA 2739989 C 4/2010
KR 20140078158 A 6/2014

OTHER PUBLICATIONS

Forrest Rogers-Marcovitz et al., "On-line Mobile Robot Model Identification using Integrated Perturbative Dynamics," Apr. 2010, pp. 47, *The Robotics Institute; Carnegie Mellon University.*

*Primary Examiner* — Brandon S Cole
(74) *Attorney, Agent, or Firm* — FINNEGAN, HENDERSON, FARABOW, GARRETT & DUNNER LLP

(57) ABSTRACT

Motion parameters estimation for localization of differential drive vehicles is an important part of robotics and autonomous navigation. Conventional methods require introceptive as well extroceptive sensors for localization. The present disclosure provides a control command based adaptive system and method for estimating motion parameters of differential drive vehicles. The method utilizes information from one or more time synchronized command signals and generate an experimental model for estimating one or more motion parameters of the differential drive vehicle by computing a mapping function. The experimental model is validated to determine change in the one or more motion parameters with change in one or more factors and adaptively updated to estimate updated value of the one or more motion parameters based on the validation. The system and method of present disclosure provide accurate results for localization with minimum use of extroceptive sensors. Further, reduced number of sensors leads to reduction in cost.

6 Claims, 27 Drawing Sheets

(51) Int. Cl.
 *G01D 21/02* (2006.01)
 *G06F 18/21* (2023.01)
 *G06F 18/214* (2023.01)
 *G06F 18/25* (2023.01)
 *G06N 3/10* (2006.01)
 *G06N 20/00* (2019.01)

(52) U.S. Cl.
 CPC .......... *G06F 18/217* (2023.01); *G06F 18/251* (2023.01); *G06N 20/00* (2019.01)

(56) References Cited

U.S. PATENT DOCUMENTS

| | | | |
|---|---|---|---|
| 10,411,356 B2* | 9/2019 | Johnson | H01Q 1/246 |
| 2007/0087756 A1* | 4/2007 | Hoffberg | G06Q 10/06375 |
| | | | 455/450 |
| 2010/0317420 A1* | 12/2010 | Hoffberg | G06Q 30/0282 |
| | | | 463/1 |
| 2013/0332064 A1* | 12/2013 | Funk | G01C 21/1652 |
| | | | 701/409 |
| 2015/0339570 A1* | 11/2015 | Scheffler | G06N 3/04 |
| | | | 706/27 |
| 2020/0158862 A1* | 5/2020 | Mahmoud | G01S 13/931 |
| 2020/0364901 A1* | 11/2020 | Choudhuri | G06T 19/006 |
| 2021/0228147 A1* | 7/2021 | Wang | A61B 5/313 |

* cited by examiner

CONTROL COMMAND BASED ADAPTIVE SYSTEM AND METHOD FOR ESTIMATING MOTION PARAMETERS OF DIFFERENTIAL DRIVE VEHICLES

PRIORITY CLAIM

This U.S. patent application claims priority under 35 U.S.C. § 119 to: India Application No. IN 201921039285, filed on Sep. 27, 2019. The entire contents of the aforementioned application are incorporated herein by reference.

TECHNICAL FIELD

The disclosure herein generally relates to field of estimating motion parameters, more particularly, to control command based adaptive system and method for estimating motion parameters of differential drive vehicles.

BACKGROUND

Differential drive vehicles as autonomous mobile robots have gained significant interests due to their applicability to various scenarios, such as surveillance and reconnaissance, search and rescue, disaster management, and industrial warehouses. Consequently, various technological aspects such as indoor/outdoor localization, motion planning and control of such autonomous robots are required to be analyzed. Localization which refers to position estimation with respect to some inertial frame and local pose tracking are among various key issues in mobile robotics. Conventional localization methods fuse measurements from exteroceptive sensors such as GPS, camera, LIDAR with measurements from interoceptive sensors such as wheel encoder, accelerometer, and gyroscopes to get position and orientation of autonomous mobile-wheeled robots. However, conventional methods depending on exteroceptive sensors only for localization suffer degradation of localization accuracy or even loss of localization. For example, frequent disruption may occur when robot moves in GPS denied areas.

Few conventional methods use an early-extended Kalman filter based localization framework, which uses odometer for position estimation and differential GPS for measurement update. Further, other conventional methods use low-cost localization scheme using a Kalman filter (KF) that fuses measurements from GPS, low cost inertial sensors, and wheel encoders. However, during GPS outages, the KF uses velocity updates from wheel encoders for reducing localization errors.

SUMMARY

Embodiments of the present disclosure present technological improvements as solutions to one or more of the above-mentioned technical problems recognized by the inventors in conventional systems. For example, in one aspect, there is provided a processor implemented method, comprising: inputting, via the one or more hardware processors, one or more time synchronized command input signals to a moving differential drive vehicle; determining, based on the one or more time synchronized command input signals, a corresponding change in one or more motion parameters of the moving differential drive vehicle; training a non-linear model using the one or more time synchronized command input signals and the determined corresponding change in the one or more motion parameters; generating, using the trained non-linear model, an experimental model by computing a mapping function between the one or more time synchronized command input signals and the one or more motion parameters of the moving differential drive vehicle; estimating, using the generated experimental model, value of the one or more motion parameters for one or more incoming time synchronized command input signals; performing, using a plurality of data obtained from one or more sensors, a validation of the estimated value of the one or more motion parameters. In an embodiment, the one or more sensors used for validation include position sensors and velocity sensors. In an embodiment, the validation is performed by computing an error between the plurality of data obtained from the one or more sensors and measurements of one or more motion parameters obtained from a ground truth system. In an embodiment, the method further comprising adaptively updating the experimental model to estimate an updated value of the one or more motion parameters based on the validation. In an embodiment, the step of adaptively updating the experimental model is performed using the computed error and a gain parameter and reduces inaccuracy introduced due to one or more factors.

In another aspect, there is provided a system comprising: a memory storing instructions; one or more communication interfaces; and one or more hardware processors coupled to the memory through the one or more communication interfaces, wherein the one or more hardware processors are configured by the instructions to: input, via the one or more hardware processors, one or more time synchronized command input signals to a moving differential drive vehicle; determine, based on the one or more time synchronized command input signals, a corresponding change in one or more motion parameters of the moving differential drive vehicle; train a non-linear model using the one or more time synchronized command input signals and the determined corresponding change in the one or more motion parameters; generate, using the trained non-linear model, an experimental model by computing a mapping function between the one or more time synchronized command input signals and the one or more motion parameters of the moving differential drive vehicle; estimate, using the generated experimental model, value of the one or more motion parameters for one or more incoming time synchronized command input signals; perform, using a plurality of data obtained from one or more sensors, a validation of the estimated value of the one or more motion parameters. In an embodiment, the one or more sensors used for validation include position sensors and velocity sensors. In an embodiment, the validation is performed by computing an error between the plurality of data obtained from the one or more sensors and measurements of one or more motion parameters obtained from a ground truth system. In an embodiment, the one or more hardware processors are further configured by the instructions to adaptively update the experimental model to estimate an updated value of the one or more motion parameters based on the validation. In an embodiment, the step of adaptively updating the experimental model is performed using the computed error and a gain parameter and reduces inaccuracy introduced due to one or more factors.

In yet another aspect, there are provided one or more non-transitory machine readable information storage mediums comprising one or more instructions which when executed by one or more hardware processors cause comprising: inputting, via the one or more hardware processors, one or more time synchronized command input signals to a moving differential drive vehicle; determining, based on the one or more time synchronized command input signals, a corresponding change in one or more motion parameters of the moving differential drive vehicle; training a non-linear model using the one or more time synchronized command input signals and the determined corresponding change in the one or more motion parameters; generating, using the trained non-linear model, an experimental model by computing a mapping function between the one or more time synchronized command input signals and the one or more motion parameters of the moving differential drive vehicle; estimating, using the generated experimental model, value of the one or more motion parameters for one or more incoming time synchronized command input signals; performing, using a plurality of data obtained from one or more sensors, a validation of the estimated value of the one or more motion parameters. In an embodiment, the one or more sensors used for validation include position sensors and velocity sensors. In an embodiment, the validation is performed by computing an error between the plurality of data obtained from the one or more sensors and measurements of one or more motion parameters obtained from a ground truth system. In an embodiment, the instructions may further cause adaptively updating the experimental model to estimate an updated value of the one or more motion parameters based on the validation. In an embodiment, the step of adaptively updating the experimental model is performed using the computed error and a gain parameter and reduces inaccuracy introduced due to one or more factors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
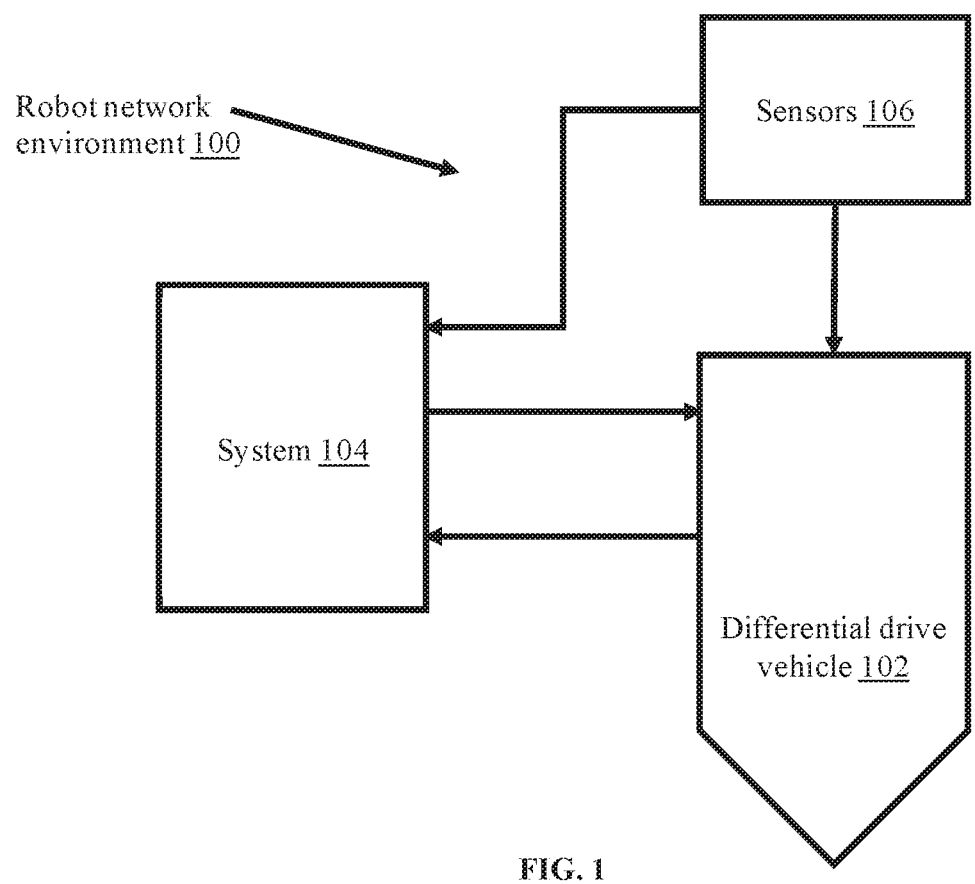
FIG. 1 illustrates an exemplary robot network environment for implementing control command based adaptive system and method for estimating motion parameters of differential drive vehicles, in accordance with an embodiment of present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide control command based adaptive system and method for estimating motion parameters of differential drive vehicles. The typical interpretation of results obtained from conventional motion parameter estimation methods has been modified to solve a problem of accurate localization of vehicles and/or robots using only interceptive sensors and adapting to challenging scenarios such as presence of different terrains, change in payload of the differential vehicle, friction, and the like. The method of present disclosure utilizes a plurality of time synchronized command input signals provided to mobile robot of the differential drive vehicle for estimation of velocity thereof. Further, an experimental model has been generated, which provides relationship between the plurality of time synchronized command input signals and the velocity of the differential drive vehicle. The generated experimental model was adaptively updated to compute one or more motion parameters of the differential drive vehicle in real time, by fusing information from a plurality of sensors, the plurality of time synchronized command input signals and orientation information received from an onboard Inertial Measurement Unit (IMU). The system and method of proposed disclosure accurately estimate one or more motion parameters of the differential drive vehicle for localization with high accuracy and reduced dependency on extroceptive sensors.

Referring now to the drawings, and more particularly to FIG. 1 through FIG. 8R, where similar reference characters denote corresponding features consistently throughout the figures, there are shown preferred embodiments and these embodiments are described in the context of the following exemplary system and/or method.

FIG. 1 illustrates an exemplary robot network environment 100 with a system 104 for implementing control command based adaptive system and method for estimating motion parameters of differential drive vehicles, in accordance with an embodiment of present disclosure. The robot network environment 100 utilizes a plurality of sensors 106 and the system 104 for estimating motion parameters of differential drive vehicle 102. The differential drive vehicle 102 is an autonomous four wheeled mobile robot which moves in the robot network environment. The robot network environment includes an indoor network area as well as outdoor network area where the differential drive vehicle moves on different surface terrains.

In an embodiment, the system 104 can be implemented as a unit within the differential drive vehicle 102. In an embodiment, the system 104 can be implemented as a stand-alone unit separated from the differential drive vehicle 102. In an embodiment, the plurality of sensors 106 may reside in the system 104 and/or may act as standalone unit. The system 104 is configured to process and analyze the data received from the plurality of sensors 106, and differential drive vehicle 102 for estimating motion parameters using control command input based adaptive methods. The system 104 is configured to process and analyze the received data in accordance with a plurality of models, further explained in conjunction with FIG. 2 through FIG. 5, and FIG. 7.

Figure 2:
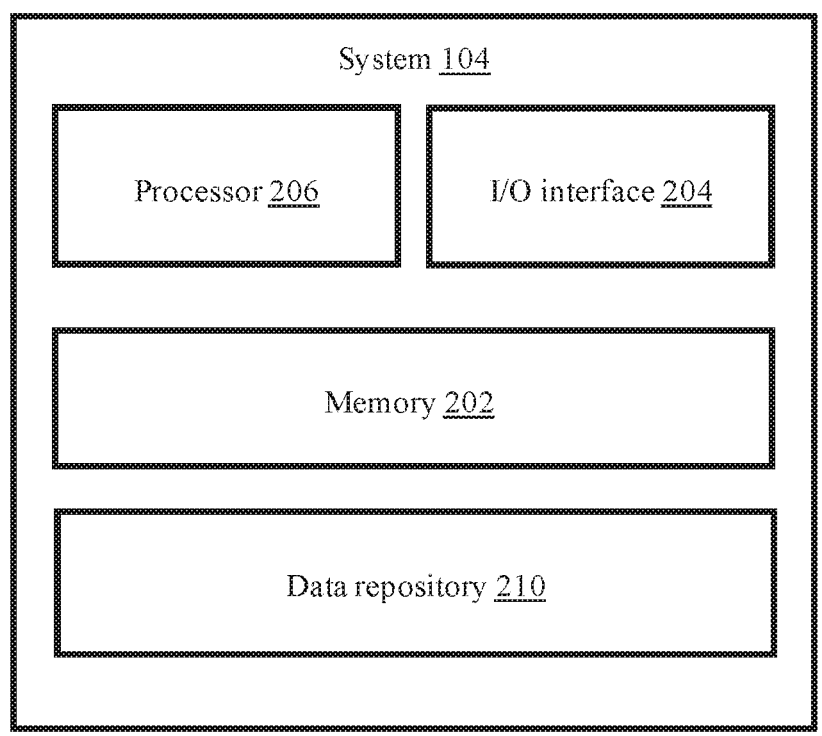
FIG. 2 illustrates a block diagram of the system of FIG. 1 for implementing control command based adaptive method for estimating motion parameters of differential drive vehicles, according to some embodiments of the present disclosure.

FIG. 2 illustrates a block diagram of the system 104 of FIG. 1 for control command based adaptive system and method for estimating motion parameters of differential drive vehicles in the robot network environment 100 of FIG. 1, according to some embodiments of the present disclosure.

In an embodiment, the system 104 includes or is otherwise in communication with one or more hardware processors such as a processor 206, an Input/Output interface 204, and at least one memory such as a memory 202. The processor 206, the I/O interface 204, and the memory 202, may be coupled by a system bus (not shown in FIG. 2).

The I/O interface 204 may include a variety of software and hardware interfaces, for example, a web interface, a graphical user interface, and the like. The interfaces 204 may include a variety of software and hardware interfaces, for example, interfaces for peripheral device(s), such as a keyboard, a mouse, an external memory, a camera device, and a printer. The interfaces 204 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 204 may include one or more ports for connecting a number of computing systems with one another or to another server computer. The I/O interface 204 may include one or more ports for connecting a number of devices to one another or to another server.

The hardware processor 206 may be implemented as one or more microprocessors, microcomputers, microcontrollers, digital signal processors, central processing units, state machines, combinational circuits, application specific integrated circuits, semiconductor devices, logic circuitries including switches, and/or any devices that manipulate signals based on operational instructions. Among other capabilities, the hardware processor 206 is configured to fetch and execute computer-readable instructions stored in the memory 202.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 202 includes a data repository 210 for storing data processed, received, and generated as output(s) by the system 104. The memory 202 stores a plurality of models such as known non-linear model, generated experimental model (alternatively referred as offline models) and adaptively updated models (alternatively referred as online models) which are further used for estimating motion parameters of differential drive vehicles in the robot network environment 100. The plurality of models stored in the memory 202 may include routines, programs, objects, components, data structures, and so on, which perform particular tasks or implement particular (abstract) data types.

The data repository 210, amongst other things, includes a system database and other data. The system database may store information but are not limited to, a plurality of parameters obtained from the plurality of sensors, wherein the parameters are specific to an entity (e.g., machine such as robot, vehicle, and the like). The plurality of parameters may comprise sensor data captured through the plurality of sensors connected to the machine. Further, the database 208 stores information pertaining to inputs fed to the system 104 and/or outputs generated by the system (e.g., at each stage), specific to the methodology described herein. More specifically, the system database stores information being processed at each step of the proposed methodology. The other data may include, data generated as a result of the execution of the plurality of models stored in the memory 202. The generated data may be further learnt to provide improved learning of the plurality of models in the next iterations to output desired results with improved accuracy.

Figure 3:
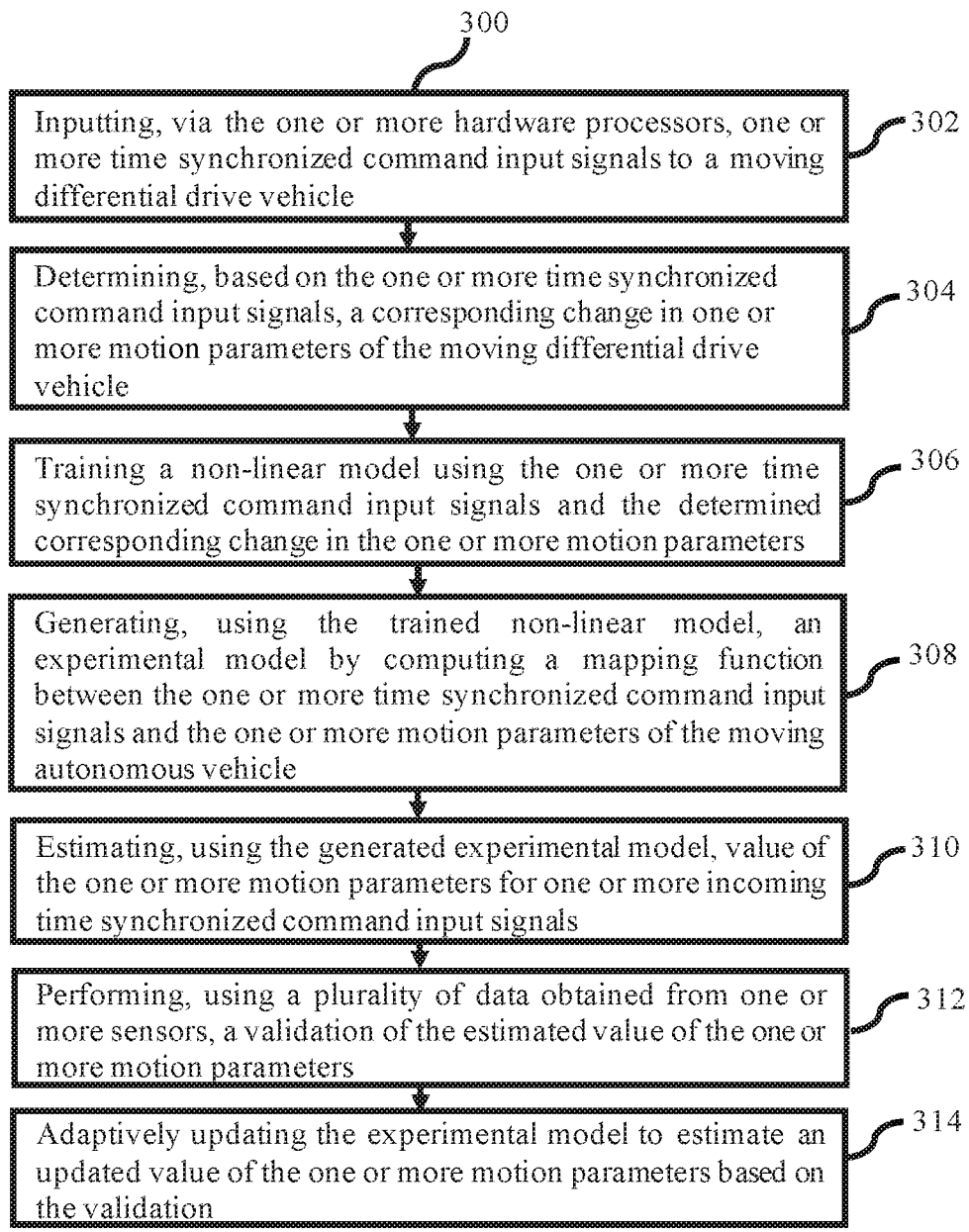
FIG. 3 illustrates an exemplary flow diagram of a processor implemented control command based adaptive method for estimating motion parameters of differential drive vehicles, in accordance with some embodiments of the present disclosure.
Figure 4:
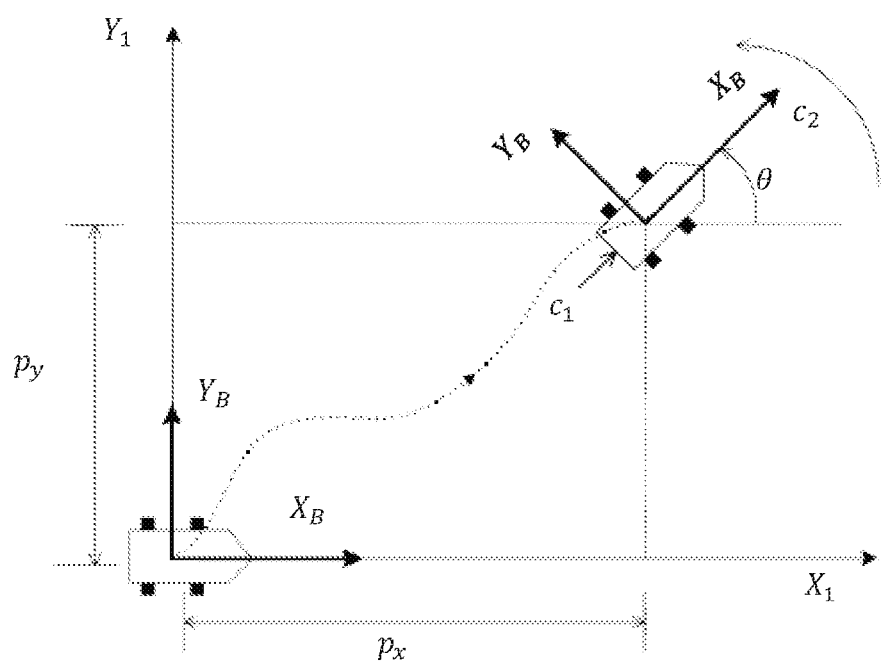
FIG. 4 illustrates a diagram characterizing motion of the differential drive vehicle in 2D space, in accordance with some embodiments of the present disclosure.

In an embodiment, the one or more hardware processors 206 can be configured to perform control command based adaptive method for estimating motion parameters of differential drive vehicles which can be carried out by using methodology, described in conjunction with FIG. 3, FIG. 4, and use case examples.

FIG. 3 illustrate an exemplary flow diagram of a processor implemented method 300, implemented by the system 104 of FIG. 1 and FIG. 2 for implementing control command based adaptive method for estimating motion parameters of differential drive vehicles, in accordance with some embodiments of the present disclosure. Referring to FIG. 3, at step 302 of the present disclosure, the one or more hardware processors 206 input one or more time synchronized command input signals to a moving differential drive vehicle. Here, the one or more time synchronized command input signals correspond to giving control commands for different movements of the moving autonomous vehicle. For example, the time synchronized command input signals could be but not limited to a command for forward motion of vehicle, command for rotation of vehicle and the like. In an embodiment, the time synchronized command input signals could be but not limited to a step signal, a ramp signal, an impulse signal, and the like.

In an embodiment, the differential drive vehicle is an autonomous robot having four wheels in which rotation is achieved by a differential push on wheel pairs at opposite sides. FIG. 4 illustrates a diagram characterizing motion of the differential drive vehicle in 2D space, in accordance with some embodiments of the present disclosure. To characterize the differential drive vehicle's (hereby referred as vehicle throughout the description) motion in 2D space, a reference frame (alternatively referred as inertial frame) and a vehicle's body frame are defined. As can be seen in FIG. 4, the reference frame is defined as $\{F_1 = X_1, Y_1\}$ the vehicle's body frame is defined as $\{F_B = X_B, Y_B\}$. In an embodiment, origin of the vehicle's body frame is fixed to vehicle's centre of mass, and it's axes $(X_B, Y_B)$ are always aligned to vehicle's front and left directions. Thus, in space, the reference frame is fixed, whereas the vehicle's body frame moves around the reference frame. Further, using a plurality of defined reference frames, unicycle kinematics for the vehicle can be expressed as provided below:

$$\begin{bmatrix} \dot{p}_x \\ \dot{p}_y \\ \dot{\theta} \end{bmatrix} = \begin{bmatrix} \cos\theta & 0 \\ \sin\theta & 0 \\ 0 & 1 \end{bmatrix} \begin{bmatrix} v \\ \omega \end{bmatrix} = \begin{bmatrix} v_x \\ v_y \\ \omega \end{bmatrix} \quad (1)$$

Here, $[p_x p_y]^T$ and $\theta$ represent translation and rotation of the vehicle's body frame $F_B$ with respect to the reference frame $F_1$ expressed in $F_1$ respectively. Further, $v$ represents forward velocity of the vehicle's body frame $F_B$ with respect to the reference frame $F_1$ expressed in $F_B$. Also, $[v_x v_y]^T$ and $\omega$ represent linear and angular velocities of the vehicle's body frame $F_B$ with respect to the reference frame $F_1$ expressed in $F_1$ respectively. In an embodiment, equation (i) helps in determining how vehicle states represented by $([p_x p_y, \theta]^T)$ evolves over time when linear and angular velocities $([v_x v_y]^T)$ are known. Further, $\omega$ and $\theta$ are estimated using a low cost 9-Degrees of freedom (Dof) inertial measurement unit (IMU) which provides information about linear accelerations, angular rates and magnetometer readings.

Further, as depicted in step 304 of FIG. 3, the one or more hardware processors 206 determine a corresponding change in one or more motion parameters of the moving differential drive vehicle based on the one or more time synchronized command input signals. In an embodiment, the one or more motion parameters could be but not limited to forward velocity, angle of rotation, change in position of the vehicle, and the like. For example, initially, a first command input signal $c_1$ is applied as step signal for forward motion of the vehicle, and a second command input signal for rotation of the vehicle is considered zero. Then, in such a case, a corresponding change in the value of forward velocity and position is determined. In an embodiment, the forward velocity $v$ is computed by sequentially differentiating position estimates of the vehicle obtained using a known in the art ground truth system. In an embodiment, the ground truth system is created to store a range of values specific to the one or more motion parameters of the differential vehicle, wherein the range of values specific to the one or more motion parameters are obtained by using a set of cameras device in real time. In an embodiment, the set of cameras may include but not limited to a monocular camera, a RGB-depth camera, an infrared camera, and a stereo-vision camera. In an embodiment, there exists some infrared/optical markers on the vehicle and the ground truth system provides real time estimates of actual value of the one or more motion parameters based on the infrared/optical markers.

Figure 5:
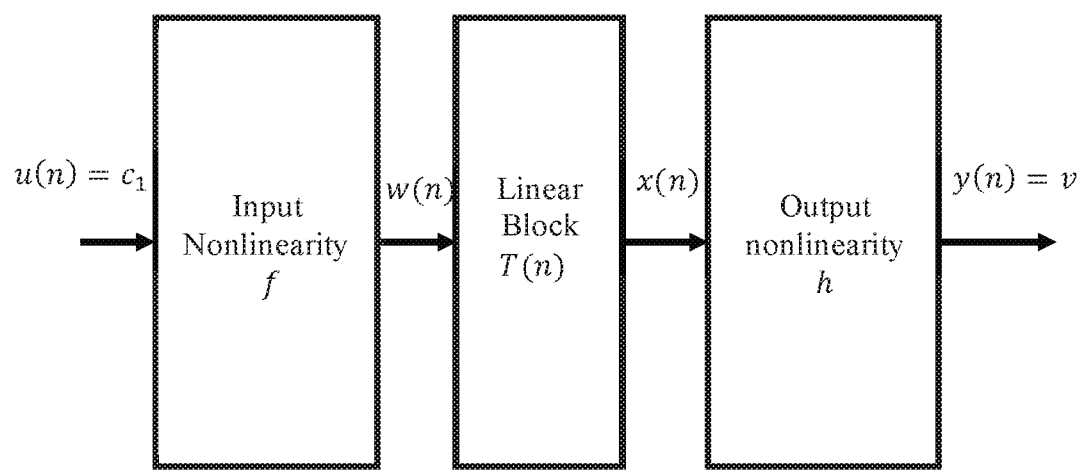
FIG. 5 illustrates a functional block diagram representing the Hammerstein-Wiener model for estimating motion parameter of the differential drive vehicle using control command, in accordance with some embodiments of the present disclosure.

Further, at step 306 of FIG. 3, the one or more hardware processors train a non-linear model by using the one or more time synchronized command input signals and the determined corresponding change in the one or more motion parameters. Further, as depicted in step 308 of FIG. 3, the one or more hardware processors 206 generate, using the trained non-linear model, an experimental model by computing a mapping function between the one or more time synchronized command input signals and the one or more motion parameters of the differential drive vehicle. In an embodiment, the non-linear model (alternatively referred as an offline model and may be interchangeably used herein after) could be but not limited to a Hammerstein wiener model. FIG. 5 illustrates a functional block diagram representing the Hammerstein-Wiener model for estimating motion parameters of the differential drive vehicle using control command, in accordance with some embodiments of the present disclosure. The Hammerstein-Wiener model describes a dynamic system using dynamic linear block in series with static nonlinear blocks. As can be seen in FIG. 5, the Hammerstein-Wiener model comprises an input non-linearity block, a linear block, and an output non-linearity block. In an embodiment, the input non-linearity block of the Hammerstein-Wiener model captures nonlinearity present in input data which is referred as input nonlinearity and represented by a non-linear function $f$. Here, the input data is a unit step time synchronized command input signal represented as $u(n)=c_1$. The non-linearity function $f$ maps the input data $u(n)=c_1$ as $w(n)=f(c_1)$ where $w(n)$ is an inner variable which represents output of the input non-linearity block and has same dimension as $u(n)$.

Figure 6A:
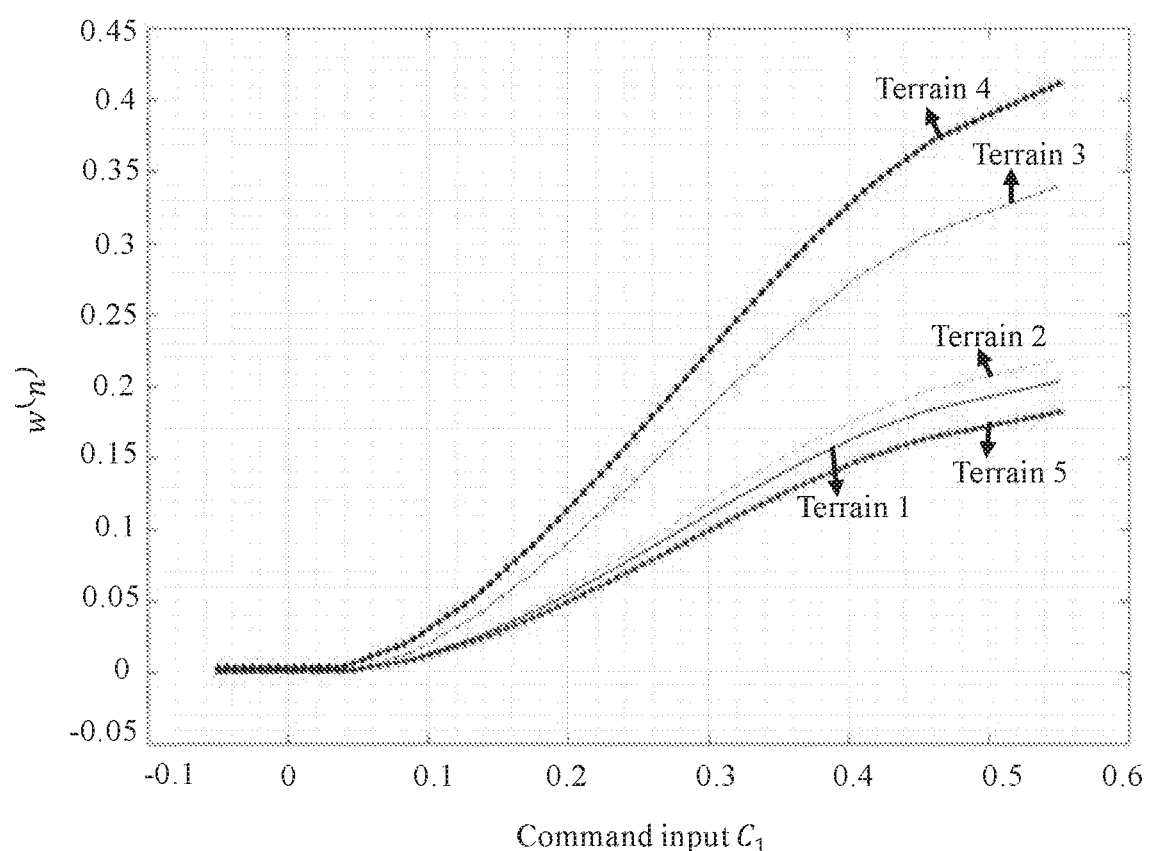
FIGS. 6A through 6C show graphs depicting outputs of different blocks of the Hammerstein-Weiner model for different terrains, in accordance with some embodiments of the present disclosure.
Figure 6B:
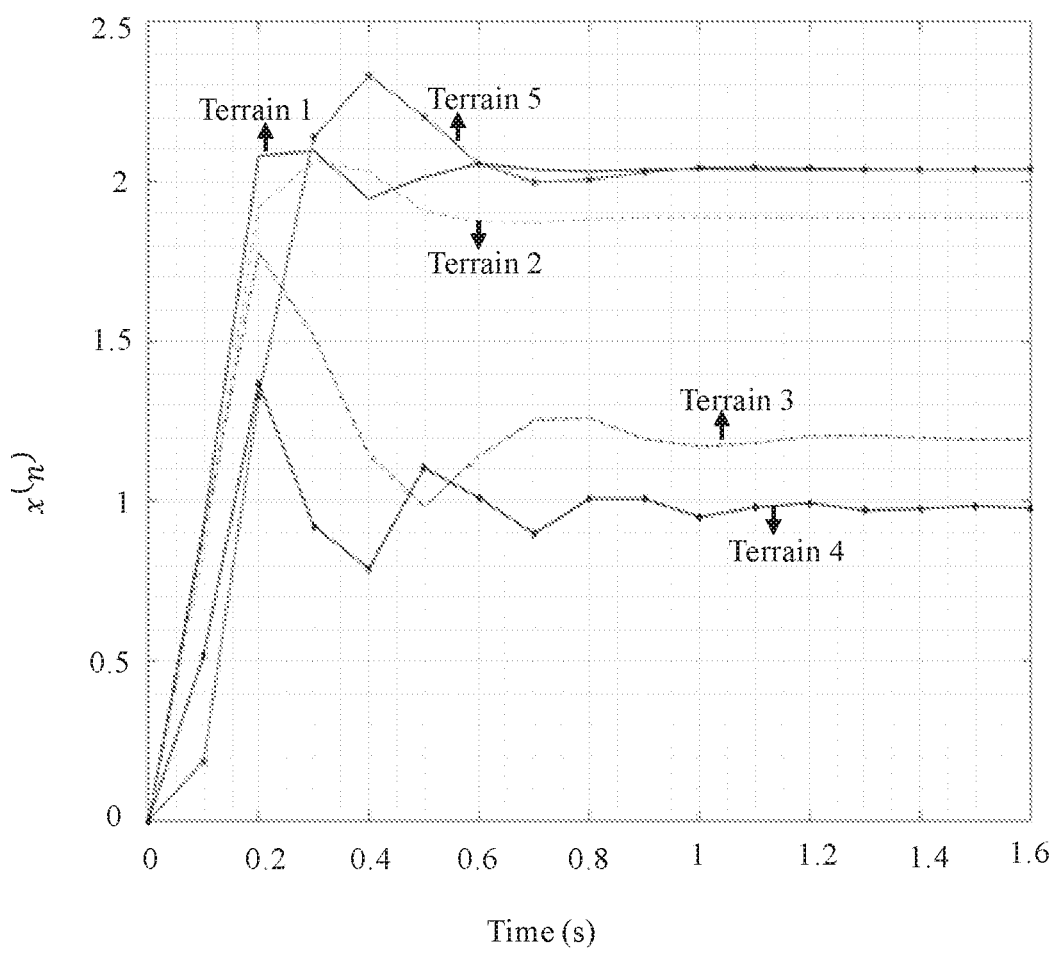
Figure 6C:
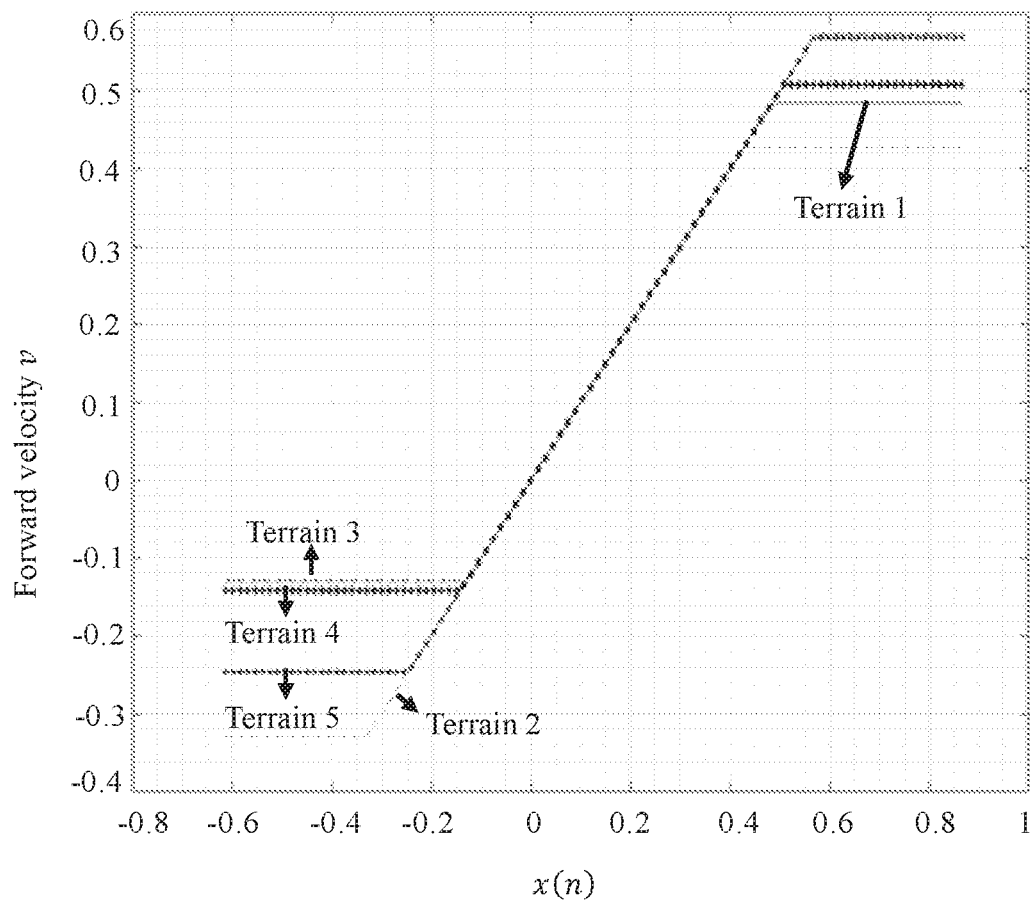

FIGS. 6A through 6C show graphs depicting outputs of different blocks of the Hammerstein-Weiner model for different terrains, in accordance with some embodiments of the present disclosure. As shown in FIG. 6A, the non-linearity in command input signal $c_1$ is captured by a piece-wise linear function. Further, using least square method, this piece-wise linear function can be closely expressed by polynomial shown in equation (2) and equation (3) provided below as:

$$f(c_1) = a_2 c_1(n^2) + a_1 c_1(n) \quad (2)$$

$$w(n) = a_2 c_1(n^2) + a_1 c_1(n) \quad (3)$$

Here, $c_1(n)$ represents $n^{th}$ instant of commanded input $c_1$ and coefficients $a_2$, $a_1$ and $a_0 \in \mathbb{R}$ define non-linearity behavior that depend on factors such as terrain, payload, and the like. Further, output of the input non-linearity block is provided as input to the linear block of the Hammerstein-Weiner model. In an embodiment, the linear block of the Hammerstein-Weiner model is a discrete transfer function that represents dynamic component of the experimental model. In the method of present disclosure, the linear block is configured as third order system represented by equation (4) provided below as:

$$T(z) = \frac{b_2 z^{-2} + b_3 z^{-3}}{d_0 + d_1 z^{-1} + d_2 z^{-2} + d_3 z^{-3}} \quad (4)$$

Here, $T(z)$ represents transfer function expressed in $z$ domain. The transfer function $T(z)$ transforms $W(z)$ to $X(z)$ as shown in equation (5) and (6) provided below as:

$$X(z) = T(z) W(z) \quad (5)$$

$$X(z) = \frac{b_2 z^{-2} + b_3 z^{-3}}{d_0 + d_1 z^{-1} + d_2 z^{-2} + d_3 z^{-3}} W(z) \quad (6)$$

Here, $W(z)$ and $X(z)$ represent $z$ transforms of discrete signals $w(n)$ and $x$. Further, inverse $z$ transform is performed on both sides of equation (6) and output of the linear block, $x(n)$ is expressed in discrete form as shown in equation (7) provided below as $$x(n) = \qquad (7)$$
$$\frac{1}{d_0}[b_2 w(n-2) + b_3 w(n-3) - d_1 x(n-1) - d_2 x(n-2) - d_3 x(n-3)]$$

Here, coefficients $b_2$, $b_3$, $d_1$, $d_2$, and $d_3 \in \mathbb{R}$ define dynamic response of the Hammerstein-Weiner model to input w(n). Further, values of these coefficients depend on factors such as terrain, payload, and the like. FIG. 6B shows a graph depicting variation in unit step response of the linear block with change in terrain. Further, upon substituting expression of input non-linearity shown in equation (3) in expression for the linear block output x(n), the equation (7) can be rewritten as $$x(n) = \frac{1}{d_0}[b_2 f(c(n-2)) + b_3 f(c(n-3)) - \qquad (8)$$
$$d_1 x(n-1) - d_2 x(n-2) - d_3 x(n-3)]$$

or $$x(n) = \frac{1}{d_0}[b_2(a_2(c_1(n-2)^2) + a_1 c_1(n-2)) +$$
$$b_3(a_2(c_1(n-3)^2) + a_1 c_1(n-3)) -$$
$$d_1 x(n-1) - d_2 x(n-2) - d_3 x(n-3)]$$

or $$x(n) = K_1(c_1(n-2))^2 + K_2 c_1(n-2)) + K_3(c_1(n-3))^2 +$$
$$K_4 c_1(n-3)) - K_5 x(n-1) - K_6 x(n-2) - K_7 x(n-3)$$

Here, $$K_1 = \frac{a_2 b_2}{d_0}, K_2 = \frac{a_1 b_2}{d_0}, K_3 = \frac{a_2 b_3}{d_0},$$
$$K_4 = \frac{a_1}{b_3 d_0}, K_5 = -\frac{d_1}{d_0}, K_6 = -\frac{d_2}{d_0}, K_7 = -\frac{d_3}{d_0}.$$

In an embodiment, knowledge of these seven model parameters defines response of input non-linearity and linear block. Further, the third order system in this case is chosen over second order system due to better accuracy during experiments.

In an embodiment, a non-linear function h is used to transform the output of the linear block x(n) to output of the non-linear model y(n)=v as y(n)=h(x(n)). The non-linear function h is referred as output non-linearity since it acts on the output of the linear block. This output non-linearity is configured as a saturation function in the method of proposed disclosure as shown in FIG. 6C to model velocity saturation of the vehicle. The output non-linearity is expressed by equation (9) provided below as:

$$y_n = \begin{cases} x(n) & \text{if } v_{min} \le x(n) \le v_{max} \\ v_{max} & \text{if } x(n) > v_{max} \\ v_{min} & \text{if } x(n) < v_{min} \end{cases} \qquad (9)$$

Here, $v_{max}$ and $v_{min}$ represent maximum velocity that the vehicle can attain in forward and backward direction respectively. From experimentation, it was observed that these saturation values occur when wheel motors of the vehicle reach their maximum capability. Hence, it was ensured during experiments that vehicle is operated in linear region of $y_n$. Thus, the method of proposed disclosure defines the unicycle kinematics for the vehicle equation as expressed in (1) to a reduced form represented by equation 10 provided below as:

$$\begin{bmatrix} \dot{p}_x \\ \dot{p}_y \end{bmatrix} = \begin{bmatrix} \cos\theta \\ \sin\theta \end{bmatrix} v = \begin{bmatrix} \cos\theta \\ \sin\theta \end{bmatrix} g(c_1) \qquad (10)$$

Here, $c_1$ represents time synchronized command input signal for the forward motion of the vehicle and $g(c_1)$ refer to the experimental model which maps $c_1$ to the forward velocity v of the vehicle. Further, the final generated experimental model represented by $v=g(c_1)$ can be expressed by equation (11) provided below as $$v(n)=y(n)=x(n)$$

or, $$v(n)=K_1(c_1(n-2))^2+K_2 c_1(n-2))+K_3(c_1(n-3))^2+K_4 c_1(n-3))-K_5 v(n-1)-K_6 v(n-2)-K_7 v(n-3) \qquad (11)$$

Referring back to FIG. 3, at step 310, the one or more hardware processors estimate, using the generated experimental model, value of the one or more motion parameters for one or more incoming time synchronized command input signals. For example, using equation (11), velocity of the vehicle can be estimated for the one or more incoming time synchronized command input signals (e.g., velocity of the vehicle could be estimated as 1 m/s for incoming time synchronized command inputs signals $c_3$ and $c_4$ for forward motion by 1 km and rotation by 1 degrees respectively) using knowledge of time synchronized command input signals stored in the generated experimental model, provided a set of model parameters expressed as $\vec{K}(n)=[K_1(n), K_2(n), K_3(n), K_4(n), K_5(n), K_6(n), K_7(n)]$ are known.

Figure 7:
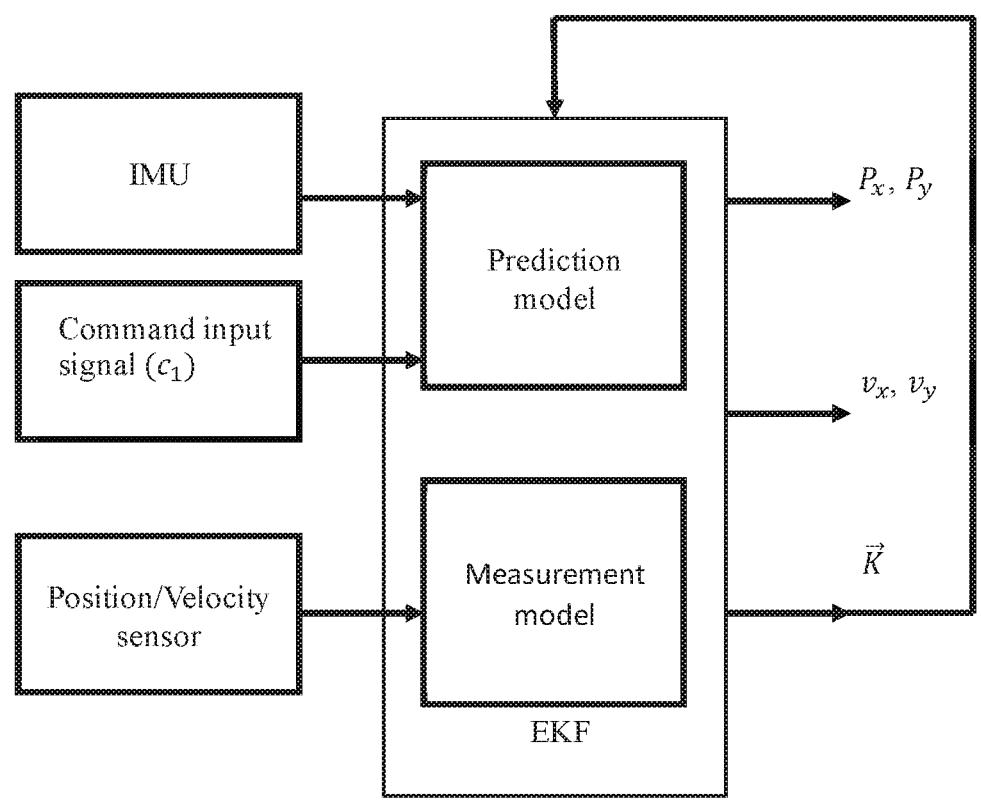
FIG. 7 illustrates a functional block diagram of an extended kalman filter (EKF) framework for estimation of the one or motion parameters in real time, in accordance with some embodiments of the present disclosure.

In an embodiment, the generated experimental model does not adapt to change in one or more factors such as terrain, vehicle payload, and challenging environmental conditions during real time operation. For example, it is assumed that the system 104 of the present disclosure for indoor navigation having smooth terrain, gives value of position of the vehicle as 1 km for a forward velocity of 1 m/s, 2 km for forward velocity of 2 m/s. However, for outdoor navigation where the terrain may change, the system 104 may provide value of the position of the vehicle as 1 km for a forward velocity of 2 m/s, 2 km for forward velocity of 5 m/s. The generated experimental model does not adapt to change in these factors while changing from indoor navigation to outdoor navigation which may lead to inaccurate results. Thus, an Extended Kalman Filter (EKF) framework based fusion approach is implemented. The EKF framework learns about the estimation of the one or motion parameters in real time to provide an adaptive model (alternatively referred as online model) by fusing a plurality of data obtained from one or more sensors. FIG. 7 illustrates a functional block diagram of the EKF framework for estimation of the one or motion parameters in real time, in accordance with some embodiment of the present disclosure. As can be seen in FIG. 7, the EKF framework comprises a prediction model and a measurement model. The generated experimental model is used as the prediction model which receives time synchronized command inputs signals and orientation information of the vehicle obtained from the inertial measurement unit as input and estimates position coordinates $P_x$, $P_y$ and velocity coordinates $v_x$, $v_y$ of the vehicle. In an embodiment, system states of the prediction model in discrete form in $n^{th}$ instant is defined by equation (12) provided below as:

$$\vec{z}(n) = [p_x(n), p_y(n), v(n), v(n-1), v(n-2), \vec{K}(n)] \tag{12}$$

Here, $p_x(n)$, $p_y(n)$ represent position coordinates of body of the vehicle in the reference frame, at $n^{th}$ time instant, $v(n)$, $v(n-1)$, and $v(n-2)$ represent the forward velocity of the vehicle at $n^{th}$, $n-1^{th}$, and $n-2^{th}$ time instant respectively, and $\vec{K}(n) = [K_1(n), K_2(n), K_3(n), K_4(n), K_5(n), K_6(n), K_7(n)]$ represents the set of model parameters of the prediction model. The discrete form of the prediction model is expressed by equation 13 provided below as:

$$p_x(n+1) = p_x(n) + T*v(n)\cos(\theta(n))$$

$$p_y(n+1) = p_y(n) + T*v(n)\sin(\theta(n))$$

$$v(n+1) = K_1 c_1(n-2)^2 + K_2 c_1(n-2)) + K_3 c_1(n-3)^2 + K_4 c_1(n-3) + K_5 v(n) + K_6 v(n-1) - K_7 v(n-2)$$

$$v(n) = v(n-1)$$

$$v(n) = v(n-1)$$

$$\vec{K}(n+1) = \vec{K}(n) \tag{13}$$

Here, T refers to sampling period and $\theta(n)$ refers to orientation information of the vehicle obtained from the inertial measurement unit. Further, jacobian of the prediction model is determined which is expressed by equation (14) provided below as:

$$\begin{bmatrix} 1 & 0 & T\cos(\theta(n)) & 0 & 0 & 0 & 0 & 0 & 0 & 0 & 0 & 0 \\ 0 & 1 & T\sin(\theta(n)) & 0 & 0 & 0 & 0 & 0 & 0 & 0 & 0 & 0 \\ 0 & 0 & K_5 & K_6 & K_7 & c_1(n-2)^2 & c_1(n-2) & c_1(n-3)^2 & c_1(n-3) & v(n) & v(n-1) & v(n-2) \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \end{bmatrix} \tag{14}$$

Referring back to FIG. 3, at step 312, the one or more hardware processors 206 perform, using a plurality of data obtained from one or more sensors, a validation of the estimated value of the one or more motion parameters. In this case, the position coordinates $P_x$, $P_y$ and velocity coordinates $v_x$, $v_y$ of the vehicle estimated from the prediction model of the EKF framework are referred as the one or more motion parameters. Further, the one or more sensors used for validation include position sensors and velocity sensors. In an embodiment, the step of validation is performed whenever data obtained from the one or more sensors is available. The data obtained from the one or more sensors is provided to the measurement model of the EKF framework. In an embodiment, the validation is performed by computing an error between the plurality of data obtained from the one or more sensors and measurements of the one or more motion parameters obtained from a ground truth system. For example, position data, obtained from position sensors as shown in FIG. 7 is expressed as $\vec{p}_m = [x_m, y_{ml}]^T$. Further, position measurements are obtained from the ground truth system and compared with the position data obtained from position sensors. The position measurements obtained from the ground truth system are transformed to the reference frame and used as measurement updates. The measurement update is expressed in equation (15) provided below as $$\vec{y}(n) = H(n)\vec{z}(n) = [I_2 \; 0_2 \; 0_2 \; 0_2 \; 0_2 \; 0_2]\vec{z}(n) \tag{15}$$

Here, $I_2$ and $0_2$ represent Identity and Null matrix of order 2, respectively. Further, the error computed between position data obtained from the position sensor and measurements updates of the ground truth system is expressed as ($\vec{p}_m - H(n)\vec{z}(n)$).

Referring to FIG. 3, at step 314, the one or more hardware processors 206 adaptively update the experimental model to estimate an updated value of the one or more motion parameters based on the validation. For example, whenever the plurality of data from the one or more sensors is available, the error is computed. In case of no error, the system 104 is not required to adapt to any changes to provide accurate results. However, in presence of error, the experimental model adapts to the changes and estimates the updated value of the one or more motion parameters. The updated one or more motion parameters are further learnt and fed back to the prediction model of the EKF framework to provide continuous updates and learning of $\vec{K}$ in the real time. In an embodiment, the step of adaptively updating the experimental model is performed using the computed error and a gain parameter as expressed in equation (16) and equation (17) provided below:

$$\vec{z}(n) = \vec{z}(n) + G(n)(\vec{p}_m - H(n)\vec{z}(n)) \tag{16}$$

$$P(n) = (I - G(n)H(n))P(n)^- \tag{17}$$

Here, G(n) represents the gain parameter which is also known as kalman gain at $n^{th}$ instant and P(n) represents process covariance matrix for the position data obtained from position sensors $\vec{p}_m$. The process covariance matrix provides a measure of accuracy of the prediction model. The gain parameter G(n) is computed using equation (18) provided below $$G(n) = P(n)^- H(n)^T (H(n)P(n)^- H(n)^T + R)^{-1} \tag{18}$$

Here, R represents noise covariance matrix for the position data obtained from position sensors $\vec{p}_m$. The noise covariance matrix provides a measure of accuracy of the plurality of data obtained from the one or more sensors. In an embodiment, the step of adaptively updating the experimental model reduces inaccuracy introduced due to the one or more factors such as change in terrain, change in payload of vehicle, and the like.

Experimental Setup:

In an embodiment, the differential drive vehicle used in the system of present disclosure comprises a RGB-depth camera for position estimation using exteroceptive sensing. Additionally, a low-cost inertial measurement unit (IMU) was employed for sensing orientation of the vehicle. Further, for locomotion, one differential drive with four 6V DC motors was used in the vehicle. The DC motors were connected to a first computation system (known in the art) via a motor driver circuit. Also, a second computation system (known in the art) was mounted upon the vehicle to make it functional and an ad hoc wireless network was created to interface the first computation system and the second computation system. A known ground truth system has been used to capture actual pose of the vehicle which is used as Ground truth for experimentation. Matlab software was used for computation of the experimental model and non-linear Hammerstein-wiener model. Further, the implementation and testing was performed using ROS platform on the second computation system.

EXPERIMENTAL RESULTS

In an embodiment, the differential drive vehicle was moved on different surfaces and trajectories. The trajectories varied from straight line to sharp turns and the velocities varied from 10 cm/sec to up to 80 cm/sec. Many experiments were performed including a variety of turning radius and frequent accelerations and decelerations, making the behavior of the vehicle highly dynamic. Motion of the vehicle remained consistent with navigation of the vehicle in real life scenarios using the method of present disclosure.

Figure 8A:
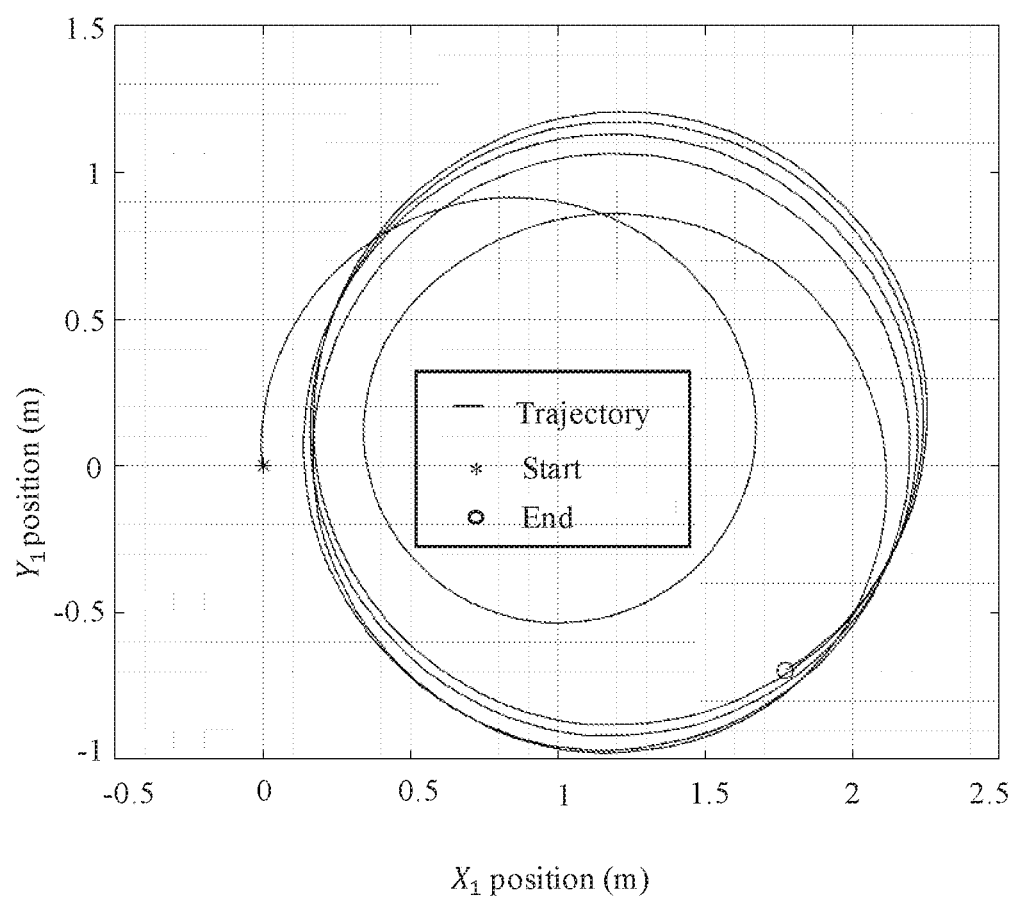
FIGS. 8A through 8R show graphs illustrating experimental results for control command based adaptive system and method for estimating motion parameters of differential drive vehicles, in accordance with some embodiments of the present disclosure.
Figure 8B:
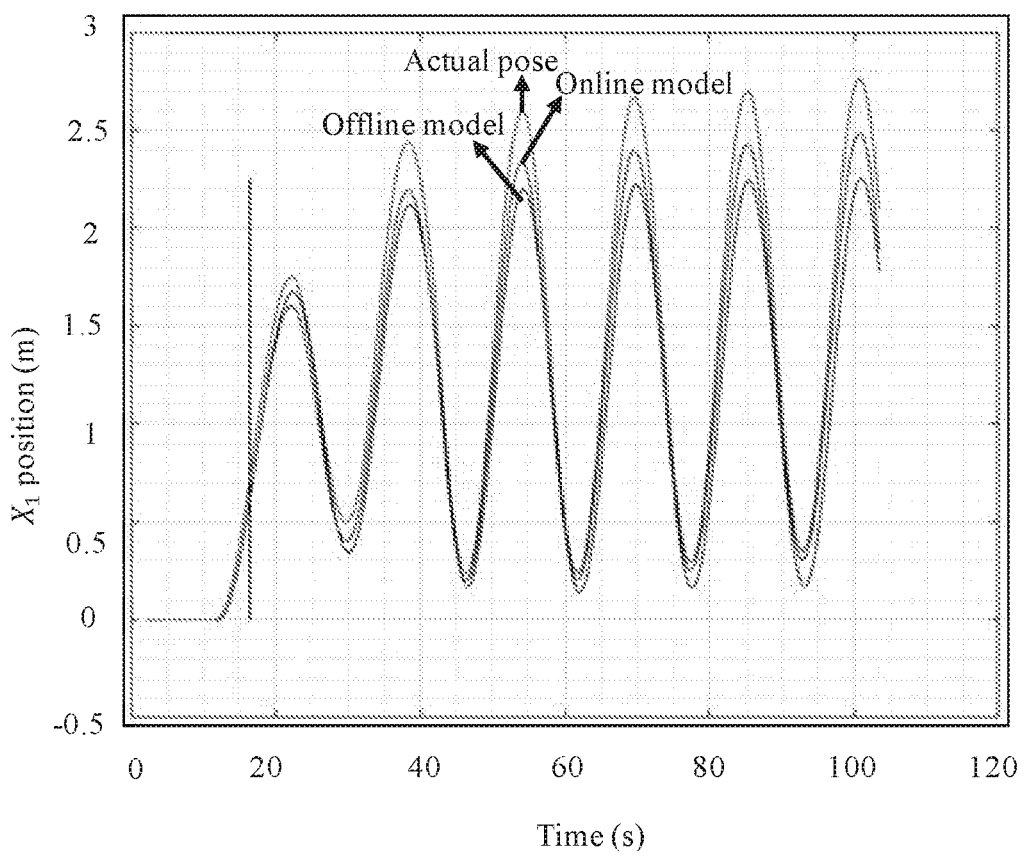
Figure 8C:
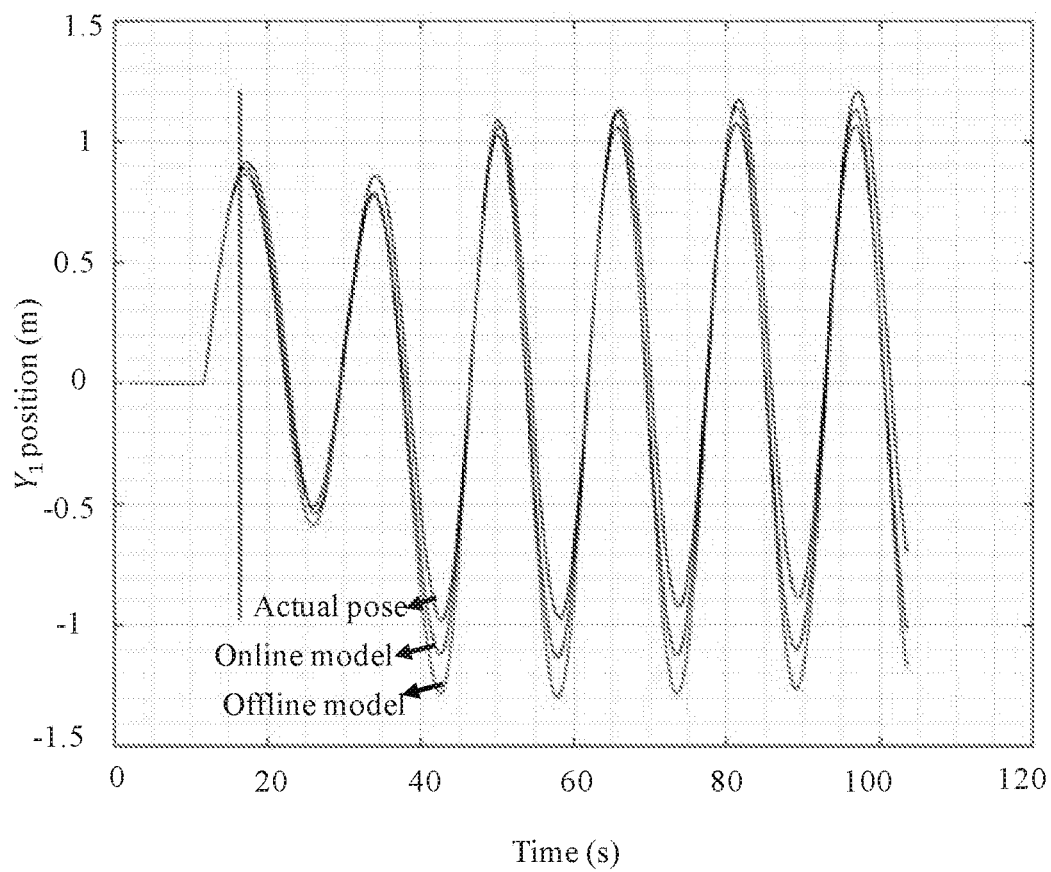
Figure 8D:
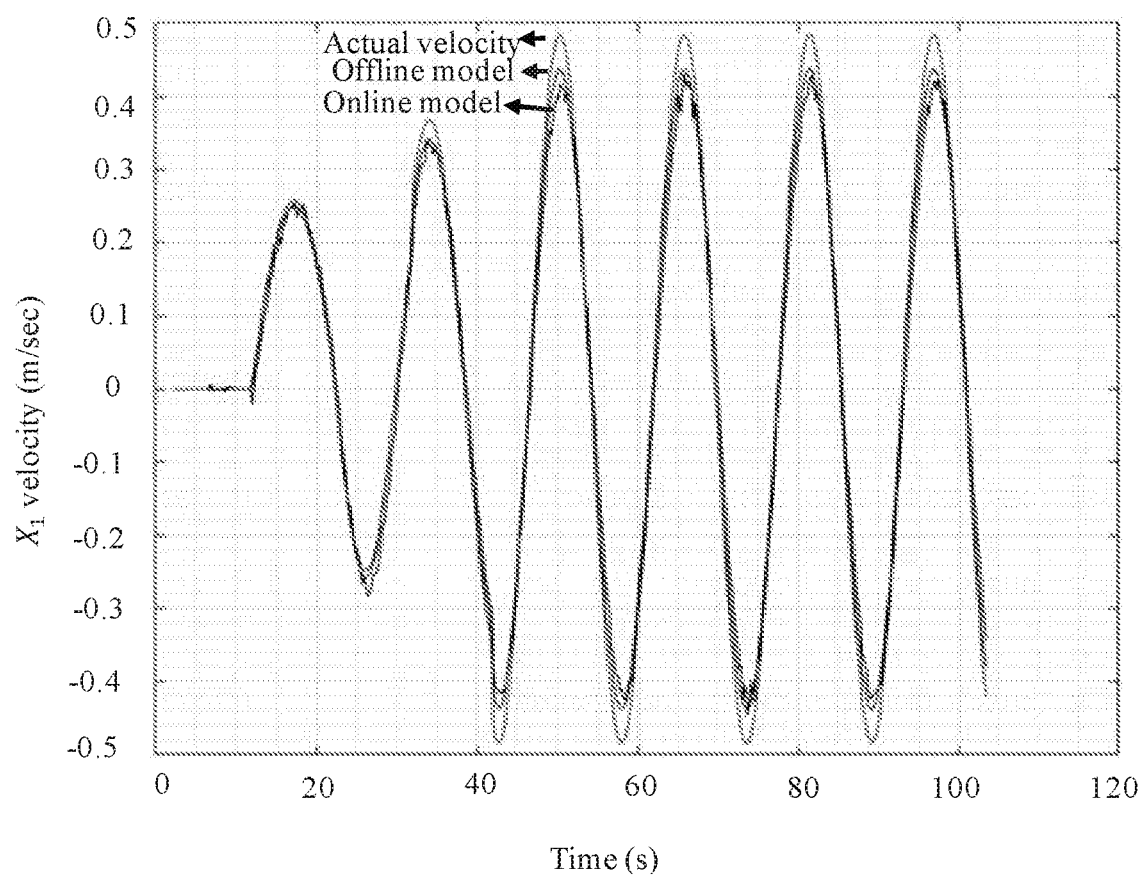
Figure 8E:
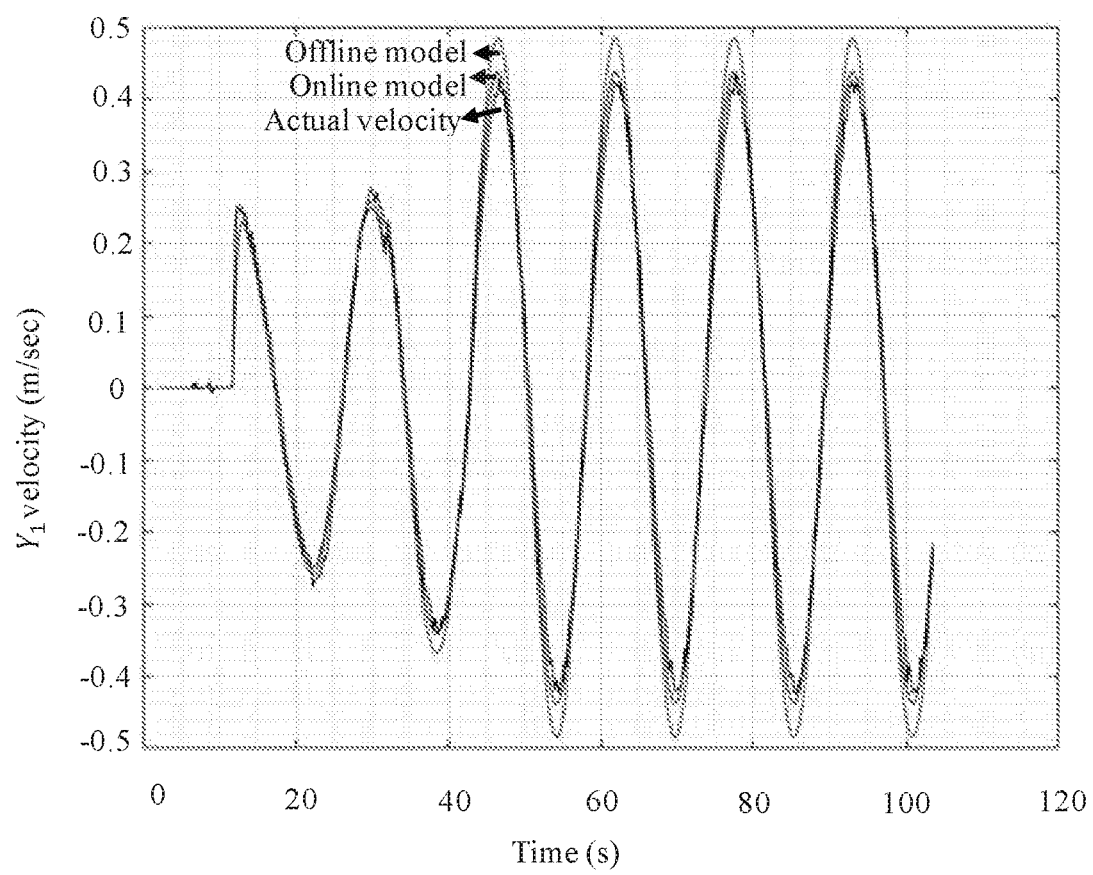
Figure 8F:
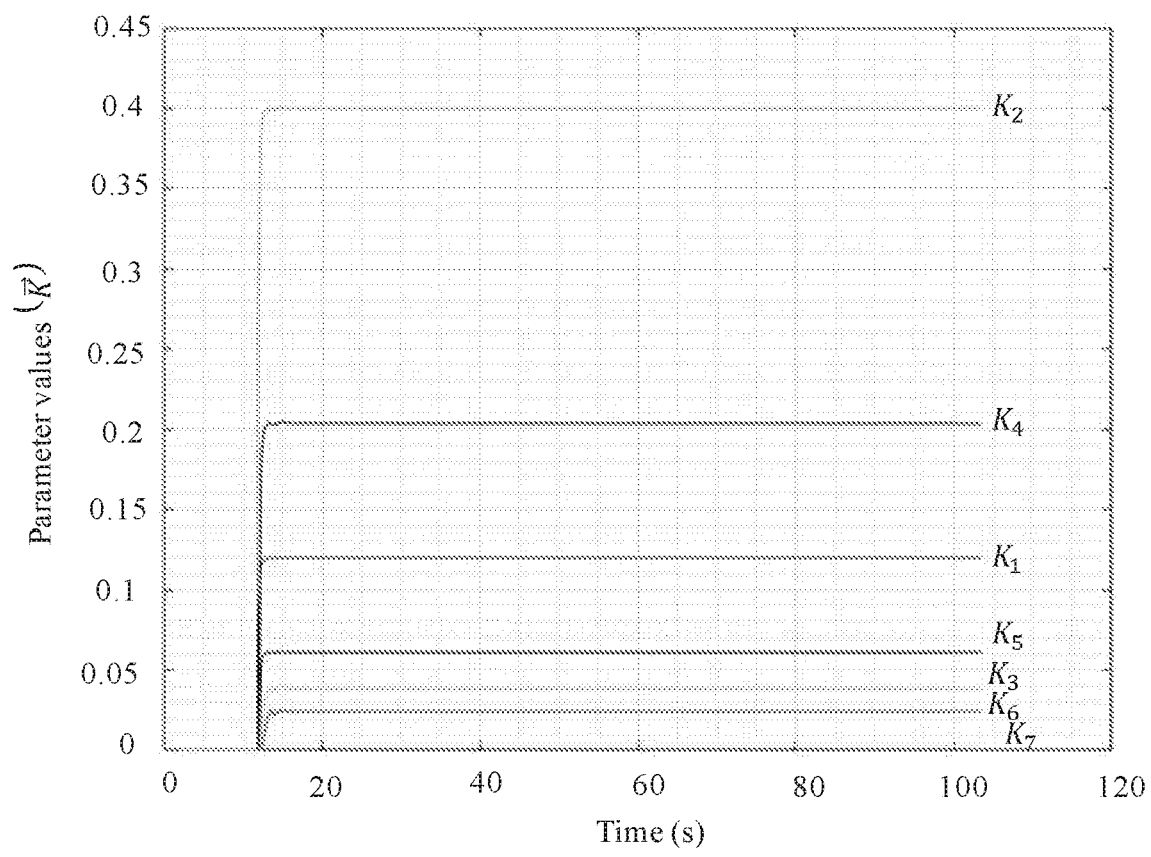
Figure 8G:
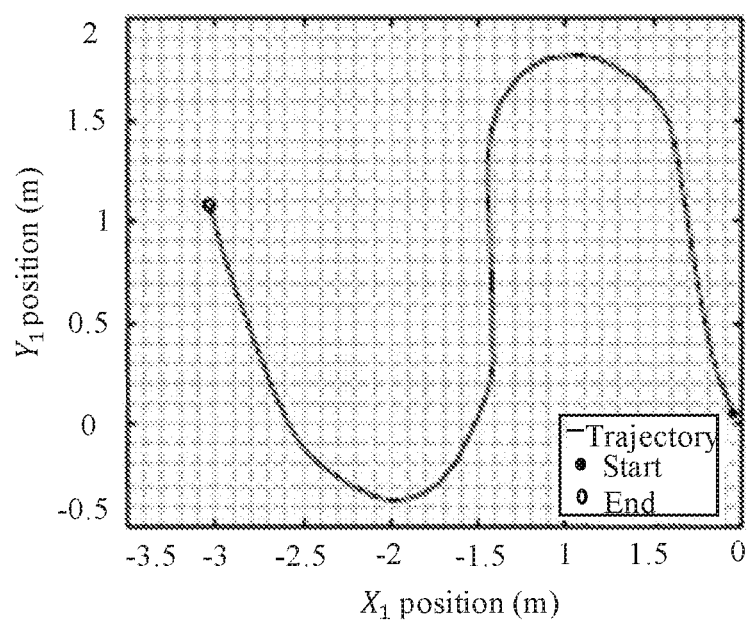
Figure 8H:
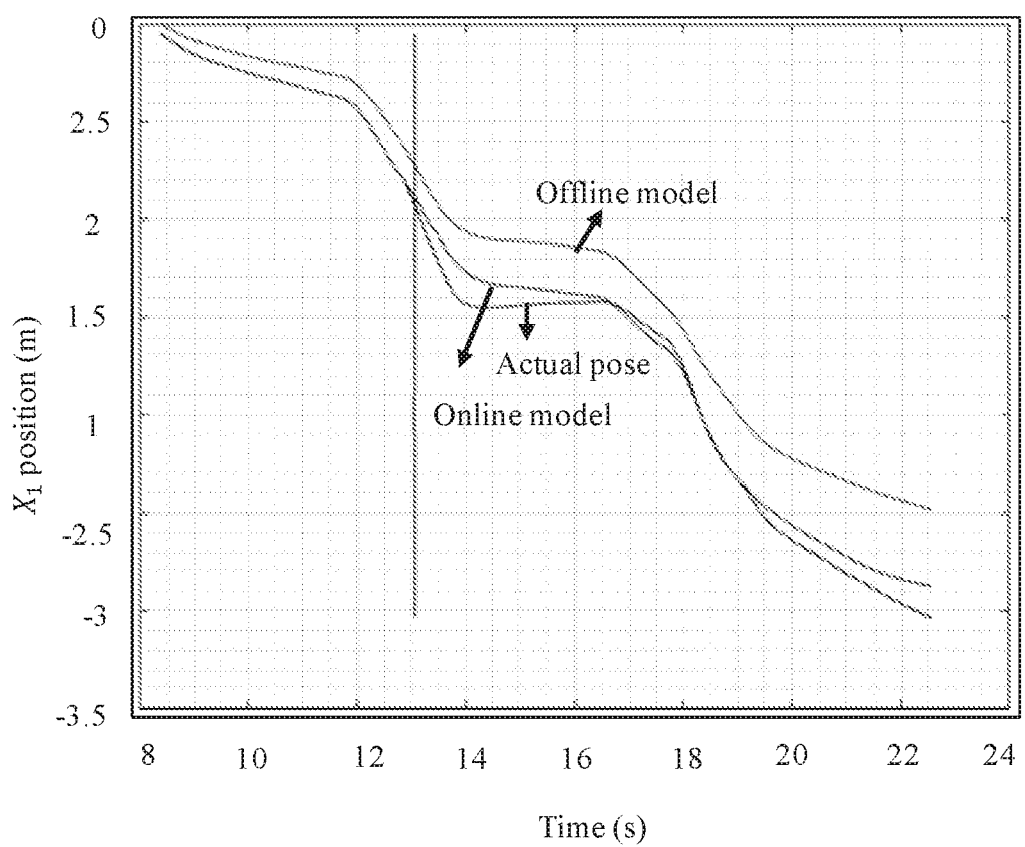
Figure 8I:
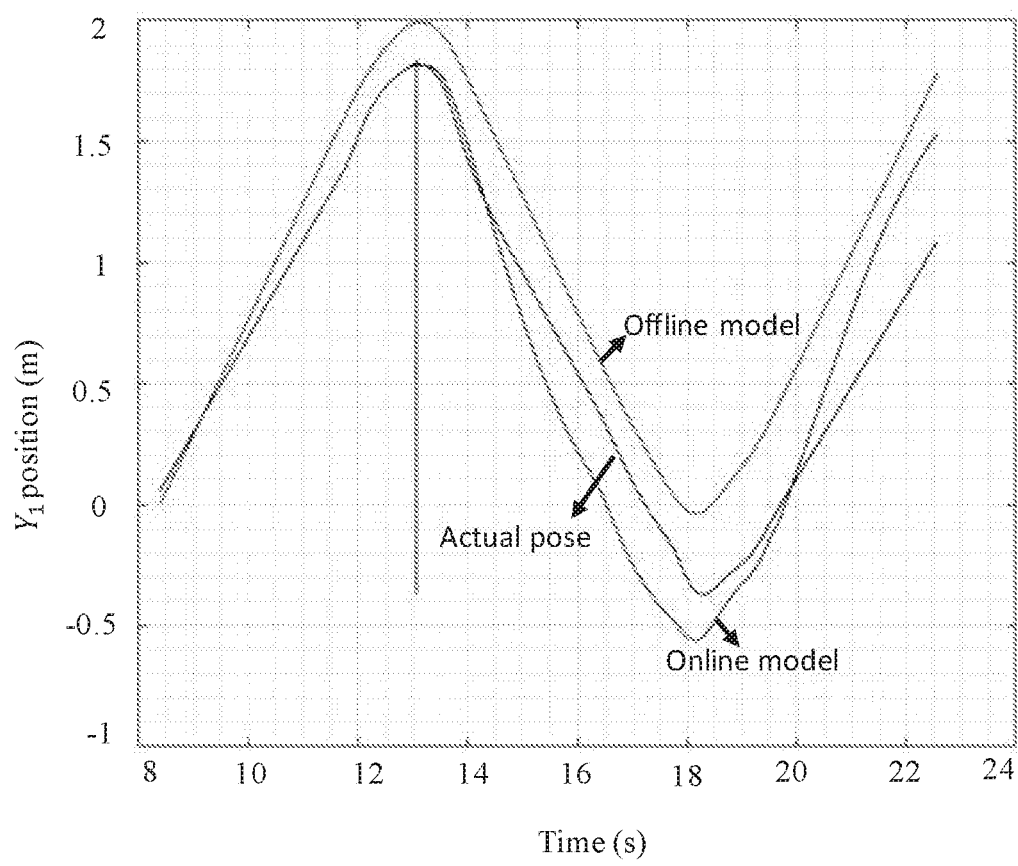
Figure 8J:
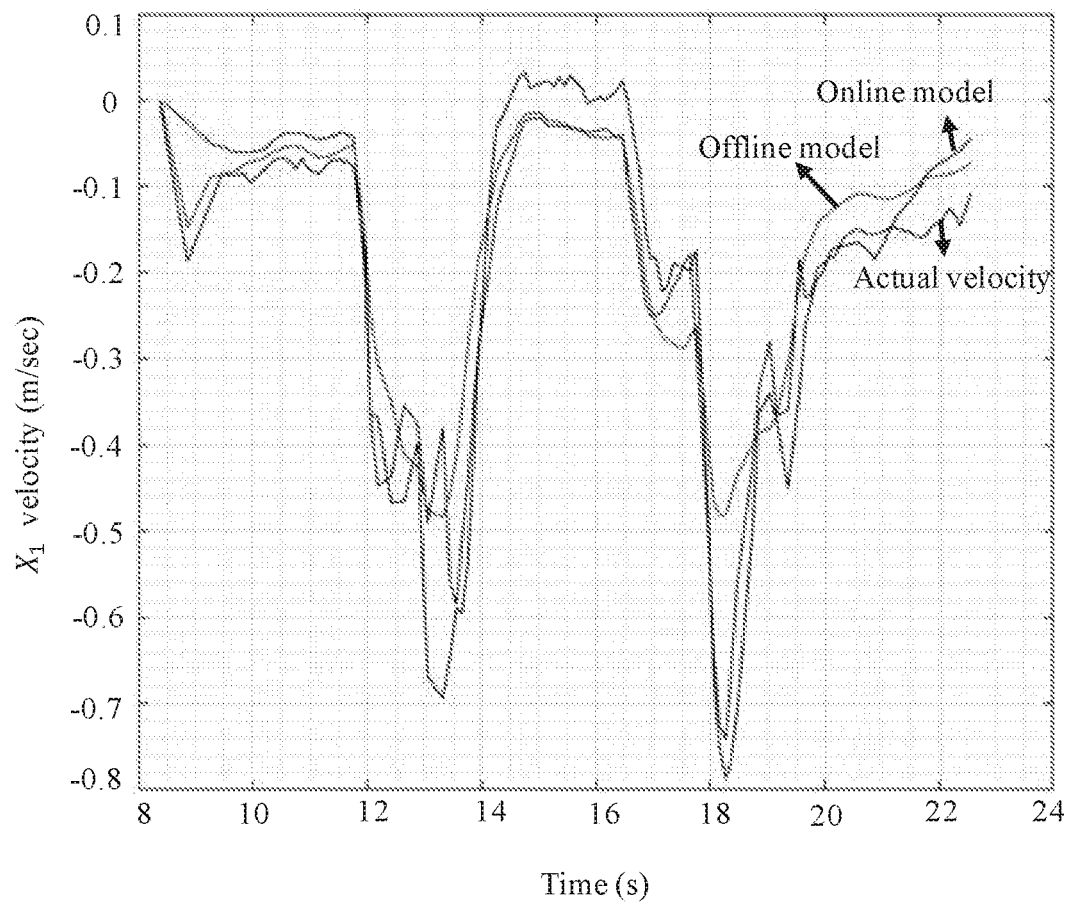
Figure 8K:
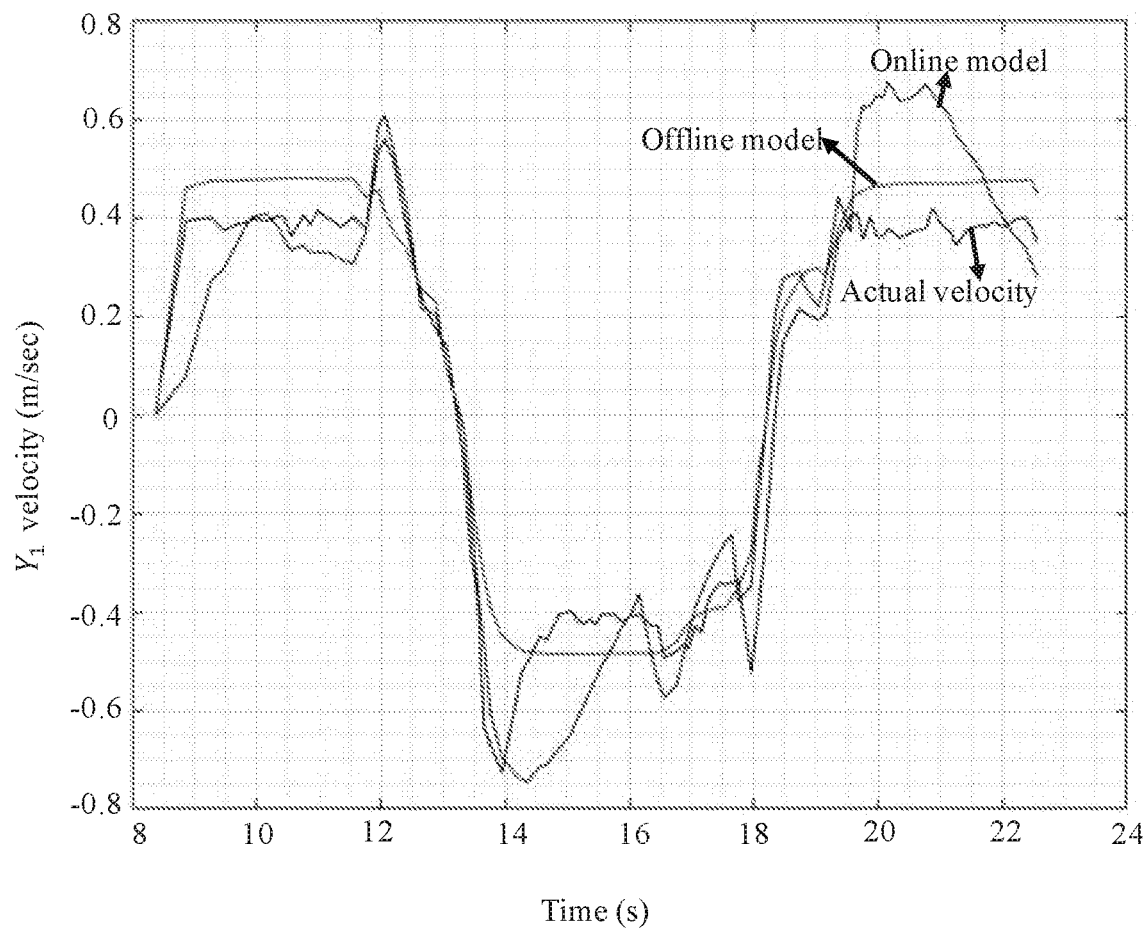
Figure 8L:
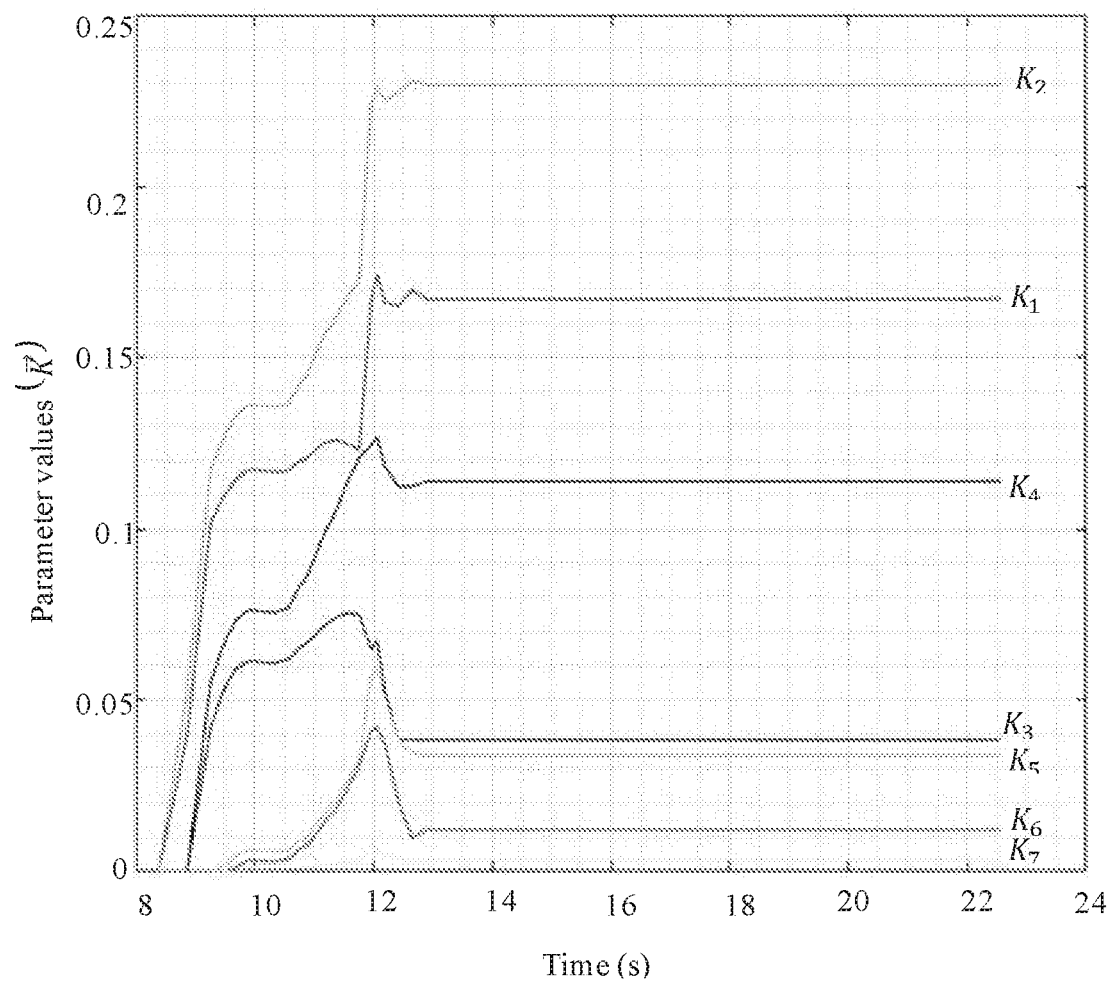
Figure 8M:
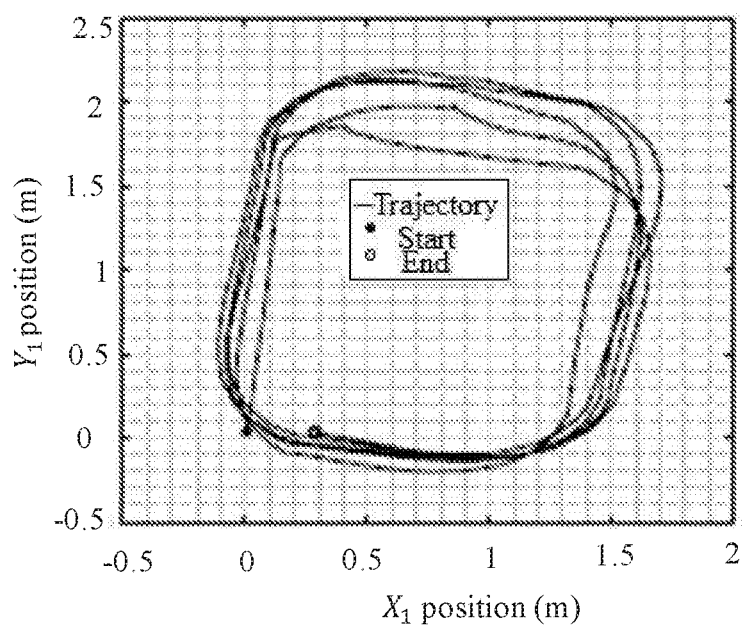
Figure 8N:
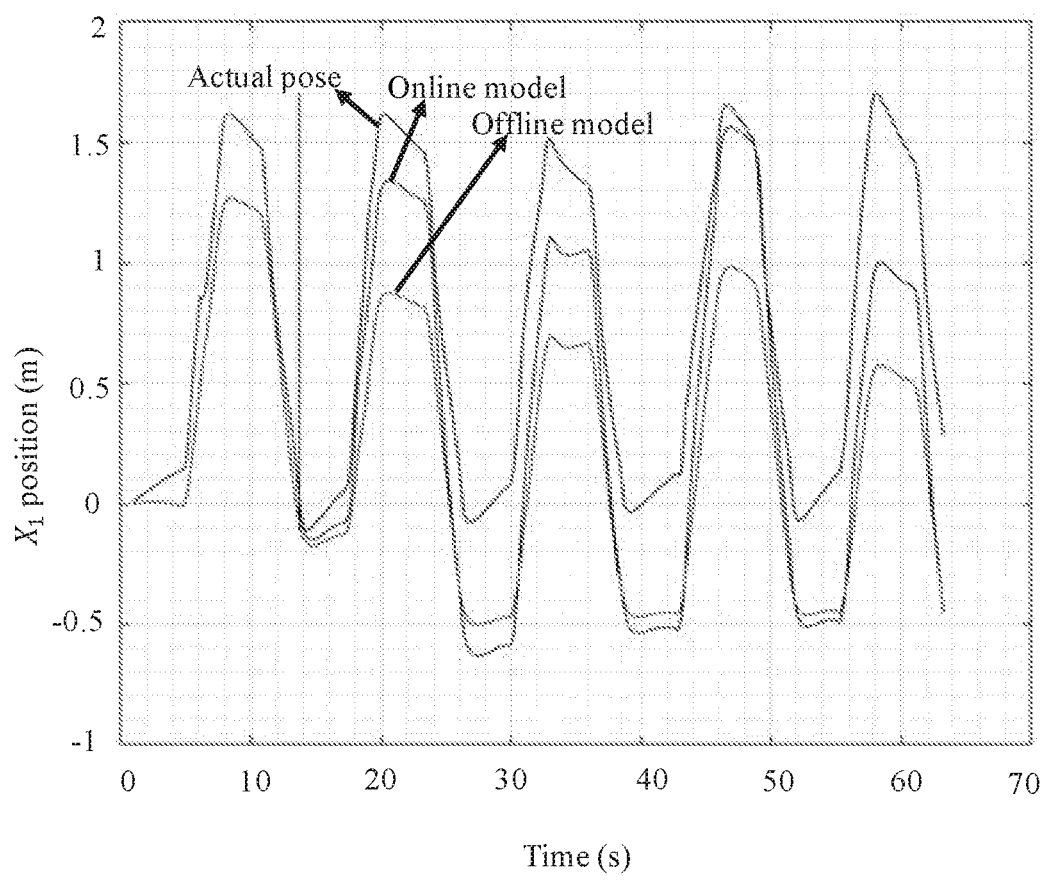
Figure 8O:
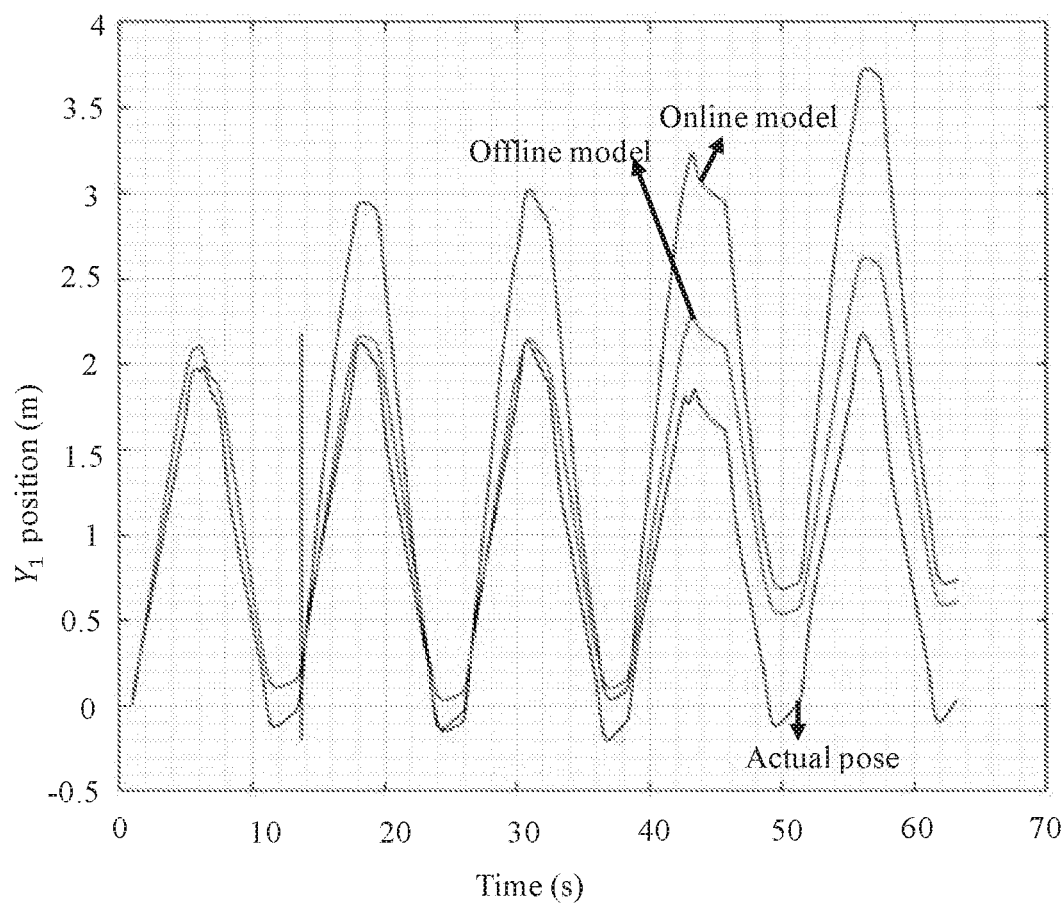
Figure 8P:
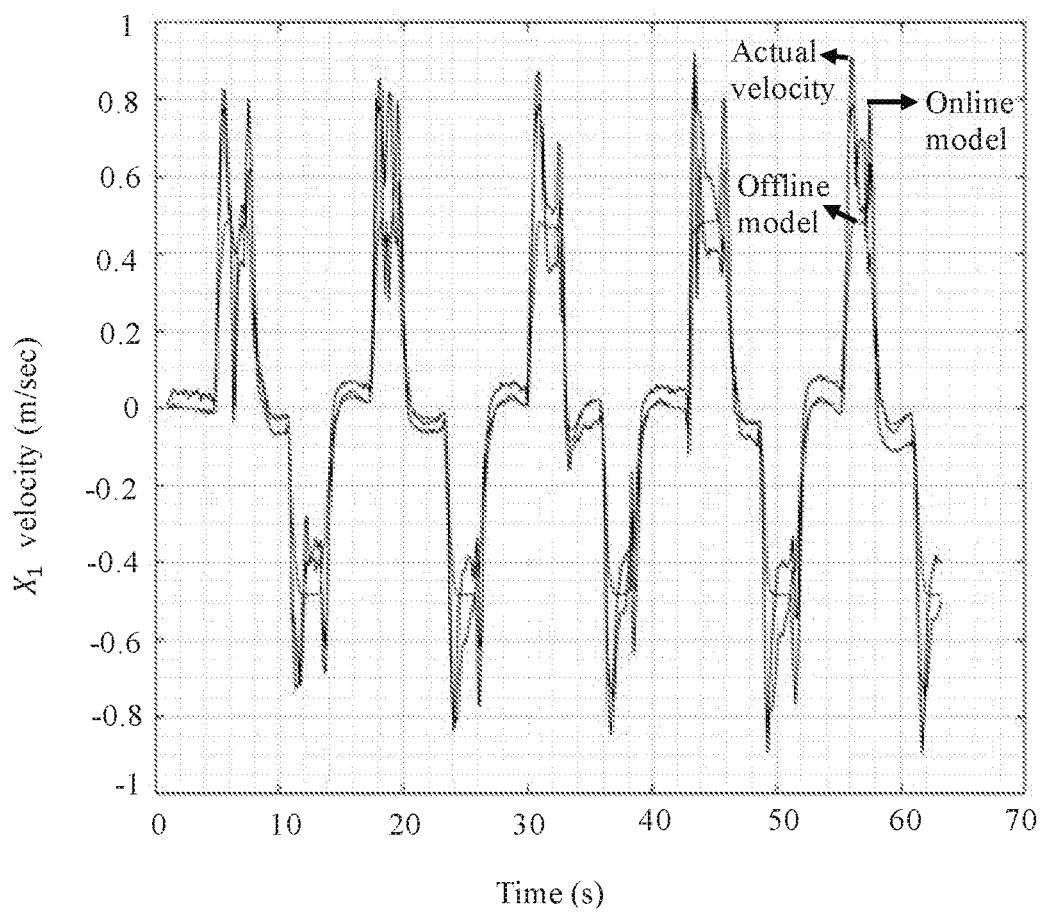
Figure 8Q:
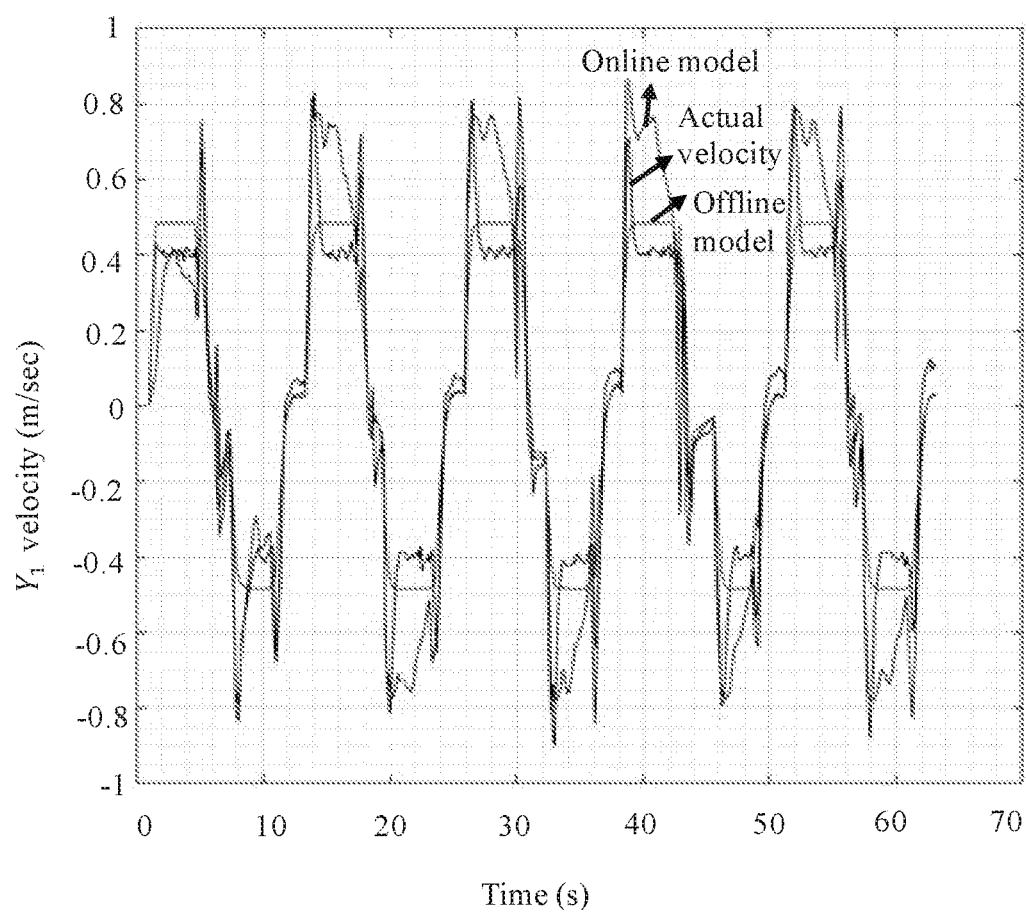
Figure 8R:
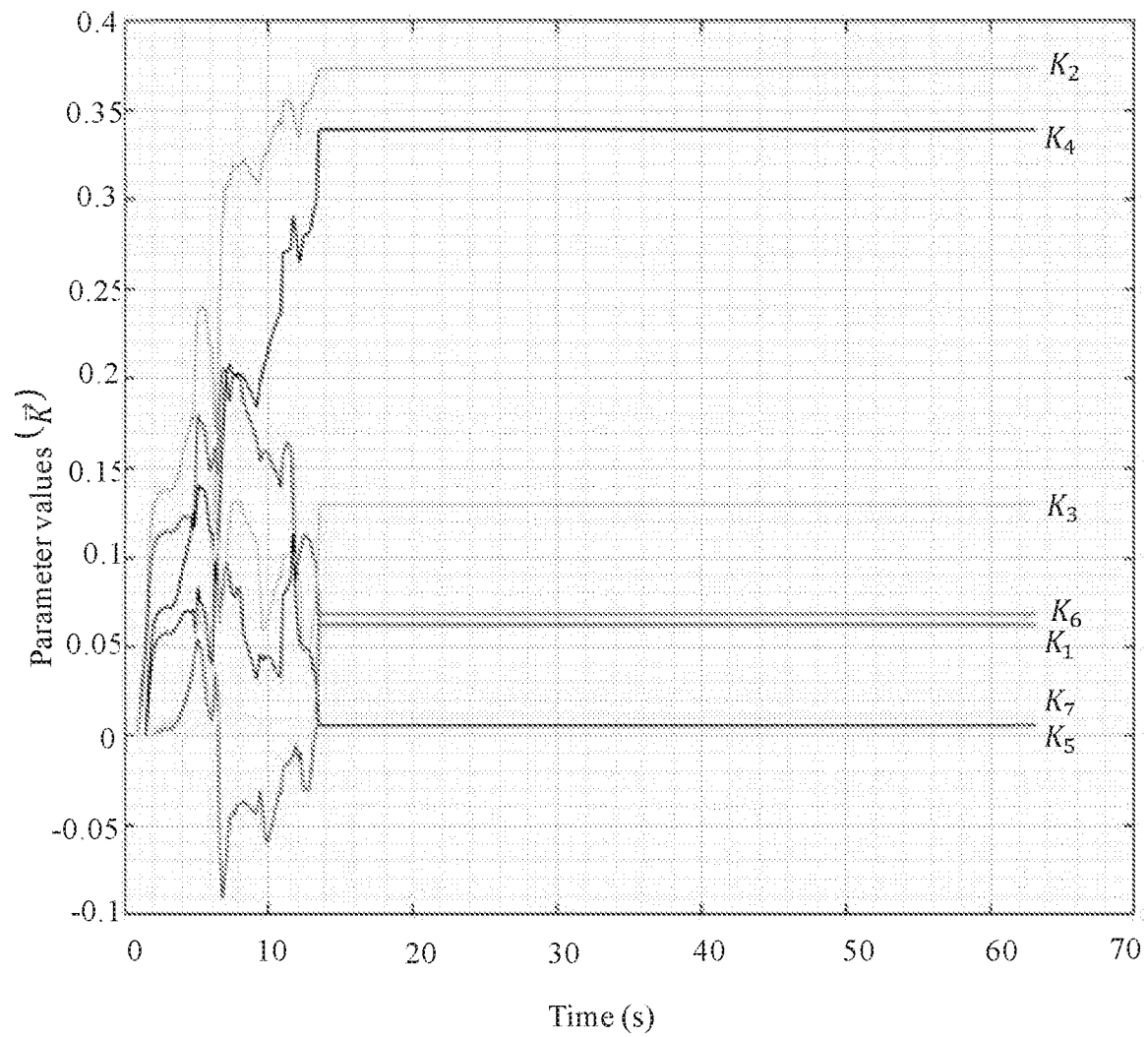

FIGS. 8A through 8R show graphs illustrating experimental results for control command based adaptive system and method for estimating motion parameters of differential drive vehicles, in accordance with some embodiments of the present disclosure. In an embodiment, the efficiency of the method of present disclosure is demonstrated by performing three different experiments. The three different experiments are described below:

Experiment 1: In this experiment, the vehicle was moved on a circular trajectory of varying radius, as shown in FIG. 8A. FIGS. 8B and 8C illustrate graphs for estimated position along X-axis and Y-axis of reference frame respectively using the method of present disclosure with corresponding ground truth values. Here the method of present disclosure includes the generated experimental (offline) model and the adaptively updated EKF (online) model. In other words, a comparison of position computed using the offline and online model with an actual position obtained from the ground truth system is provided. As known, the online model requires measurement updates from the position sensors to estimate the set of model parameters $\vec{K}$. The vertical line in the graphs depicted by FIGS. 8B and 8C represent time instant till which measurement updates from the position sensors are sufficient to estimate $\vec{K}$. After this time instant, no measurements were considered to be available from the position sensor. Similarly, FIGS. 8D and 8E illustrate graphs for estimated velocity along X-axis and Y-axis of the reference frame respectively using the method of present disclosure with the corresponding ground truth values. In other words, a comparison of velocity computed using the offline and online model with an actual velocity obtained from the ground truth system is provided. FIG. 8F shows individual components of estimated $\vec{K}$ using online model. For the offline model, these model parameters are computed beforehand.

Experiment 2: In this experiment, the vehicle was moved on S shape trajectory with frequent steep turns as shown in FIG. 8G. For experiment 2, plots of estimated position and velocity along X-axis and Y-axis of the reference frame using the method of present disclosure with the corresponding ground truth values are provided in FIGS. 8H through 8K respectively. FIG. 8L shows individual components of estimated $\vec{K}$ using online model for experiment 2.

Experiment 3: In this experiment, the vehicle was moved on a rectangular trajectory with steep turns as shown in FIG. 8M. Sharp turns in trajectory makes it susceptible to slippage, which violates a no slip assumption. For experiment 3, plots of estimated position and velocity along X-axis and Y-axis of the reference frame using the method of present disclosure with the corresponding ground truth values are provided in FIGS. 8N through 8Q respectively. FIG. 8R shows individual components of estimated $\vec{K}$ using online model for experiment 3.

Table 1 provides root mean square (RMS) errors in estimated position and velocity for the three experiments using online and offline models.

TABLE 1

| Experiment | Position Error (m) | | Velocity Error (m/sec) | | |
| --- | --- | --- | --- | --- | --- |
| No. | $X_1$ | $Y_1$ | $X_1$ | $Y_1$ | Model |
| 1 | 0.1272 | 0.1404 | 0.0286 | 0.0295 | Online |
| 2 | 0.0746 | 0.2280 | 0.0690 | 0.1456 | |
| 3 | 0.3976 | 0.1048 | 0.1048 | 0.1860 | |
| 1 | 0.2654 | 0.2001 | 0.0454 | 0.0467 | Offline |
| 2 | 0.3151 | 0.3508 | 0.0989 | 0.1031 | |
| 3 | 0.5605 | 0.3532 | 0.1418 | 0.1412 | |

Offline model: For this model, the set of model parameters ($\vec{K}$) for all the three experiments were computed beforehand. The RMS errors for all the experiments are presented in Table 1. It is evident from the Table 1 that for the trajectories similar to experiments 1 and 2, the errors for position and velocity estimation are (well) below 0.5 m and 0.15 m/sec respectively. However, for experiment 3, which violates no slip assumption because of sharp turns, the position and velocity error are relatively higher, but still below 1 m and 0.2 m/sec respectively.

Online model: For this model, the set model parameters ($\vec{K}$) were computed in real time, and no prior information was available. The EKF framework used measurement updates from position sensor to compute $\vec{K}$, wherein these updates were required by the method of present disclosure only during the initial period of the experiment for computation. The vertical line in FIGS. 8B through 8D for experiment 1, FIGS. 8H through 8K for experiment 2, and FIGS. 8N through 8Q for experiment 3 show time instant till which position updates have been used to compute $\vec{K}$, and FIG. 8F for experiment 1, 8L for experiment 2, and 8R for experiment 3 show how $\vec{K}$ evolves over time during experiments. As can be seen from Table 1, the errors for position and velocity estimation are contained well below 1 m and 0.2 m/sec, almost similar to offline model.

The method of the present disclosure provides accurate results for localization or estimating the motion parameters of the differential drive vehicle with minimum use of extroceptive sensors. Reduction in the number of sensors leads to reduced cost. Also, the system of the present disclosure adapts to change in different factors such as terrain, payload change, and the like by continuous learning.

The illustrated steps of method 300 is set out to explain the exemplary embodiments shown, and it should be anticipated that ongoing technological development may change the manner in which particular functions are performed. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
inputting, via the one or more hardware processors, one or more time synchronized command input signals to a moving differential drive vehicle, wherein the one or more time synchronized command input signals correspond to providing a plurality of control commands for different movements of the moving differential drive vehicle;
determining, based on the one or more time synchronized command input signals, a corresponding change in one or more motion parameters of the moving differential drive vehicle;
training a non-linear model using the one or more time synchronized command input signals and the determined corresponding change in the one or more motion parameters, wherein
the non-linear model is a Hammerstein wiener model,
the Hammerstein-Wiener model comprises an input non-linearity block, a linear block, and an output non-linearity block, and
the input non-linearity block of the Hammerstein-Wiener model captures nonlinearity present in input data which is referred as input nonlinearity and represented by a non-linear function, and
the input data is a unit step time synchronized command input signal represented as $u(n)=c_1$;
generating, using the trained non-linear model, an experimental model by computing a mapping function between the one or more time synchronized command input signals and the one or more motion parameters of the moving differential drive vehicle;

estimating, using the generated experimental model, a value of the one or more motion parameters for one or more incoming time synchronized command input signals;

performing, using a plurality of data obtained from one or more sensors, a validation of the estimated value of the one or more motion parameters, wherein the one or more sensors used for validation include position sensors and velocity sensors, and the validation is performed by computing an error between the plurality of data obtained from the one or more sensors and measurements of one or more motion parameters obtained from a ground truth system; and adaptively updating the experimental model to estimate an updated value of the one or more motion parameters based on the validation, wherein the step of adaptively updating the experimental model is performed using the computed error and a gain parameter.

2. The processor implemented method of claim 1, wherein adaptively updating the experimental model reduces inaccuracy introduced due to one or more factors.

3. A system, comprising:

a memory;

one or more communication interfaces; and one or more hardware processors coupled to said memory through said one or more communication interfaces, wherein said one or more hardware processors are configured to:

input one or more time synchronized command input signals to a moving differential drive vehicle, wherein the one or more time synchronized command input signals correspond to providing a plurality of control commands for different movements of the moving differential drive vehicle;

determine, based on the one or more time synchronized command input signals, a corresponding change in one or more motion parameters of the moving differential drive vehicle;

train a non-linear model using the one or more time synchronized command input signals and the determined corresponding change in the one or more motion parameters, wherein the non-linear model is a Hammerstein wiener model, the Hammerstein-Wiener model comprises an input non-linearity block, a linear block, and an output non-linearity block, and the input non-linearity block of the Hammerstein-Wiener model captures nonlinearity present in input data which is referred as input nonlinearity and represented by a non-linear function, and the input data is a unit step time synchronized command input signal represented as $u(n)=c_1$;

generate, using the trained non-linear model, an experimental model by computing a mapping function between the one or more time synchronized command input signals and the one or more motion parameters of the moving differential drive vehicle;

estimate, using the generated experimental model, a value of the one or more motion parameters for one or more incoming time synchronized command input signals;

perform, using a plurality of data obtained from one or more sensors, a validation of the estimated value of the one or more motion parameters, wherein the one or more sensors used for validation include position sensors and velocity sensors, and the validation is performed by computing an error between the plurality of data obtained from the one or more sensors and measurements of one or more motion parameters obtained from a ground truth system; and adaptively update the experimental model to estimate an updated value of the one or more motion parameters based on the validation, wherein the step of adaptively updating the experimental model is performed using the computed error and a gain param.

4. The system of claim 3, wherein adaptively updating the experimental model reduces inaccuracy introduced due to one or more factors.

5. One or more non-transitory machine-readable information storage mediums comprising one or more instructions which when executed by one or more hardware processors cause:

inputting, via the one or more hardware processors, one or more time synchronized command input signals to a moving differential drive vehicle, wherein the one or more time synchronized command input signals correspond to providing a plurality of control commands for different movements of the moving differential drive vehicle;

determining, based on the one or more time synchronized command input signals, a corresponding change in one or more motion parameters of the moving differential drive vehicle;

training a non-linear model using the one or more time synchronized command input signals and the determined corresponding change in the one or more motion parameters, wherein the non-linear model is a Hammerstein wiener model, the Hammerstein-Wiener model comprises an input non-linearity block, a linear block, and an output non-linearity block, and the input non-linearity block of the Hammerstein-Wiener model captures nonlinearity present in input data which is referred as input nonlinearity and represented by a non-linear function, and the input data is a unit step time synchronized command input signal represented as $u(n)=c_1$;

generating, using the trained non-linear model, an experimental model by computing a mapping function between the one or more time synchronized command input signals and the one or more motion parameters of the moving differential drive vehicle;

estimating, using the generated experimental model, a value of the one or more motion parameters for one or more incoming time synchronized command input signals;

performing, using a plurality of data obtained from one or more sensors, a validation of the estimated value of the one or more motion parameters, wherein the one or more sensors used for validation include position sensors and velocity sensors, and the validation is performed by computing an error between the plurality of data obtained from the one or more sensors and measurements of one or more motion parameters obtained from a ground truth system; and adaptively updating the experimental model to estimate an updated value of the one or more motion parameters based on the validation, wherein the step of adaptively updating the experimental model is performed using the computed error and a gain parameter.

6. The one or more non-transitory machine-readable information storage mediums of claim 5, wherein adaptively updating the experimental model reduces inaccuracy introduced due to one or more factors.

\* \* \* \* \*